United States Patent [19]
Busch

[11] 3,962,536
[45] June 8, 1976

[54] DIGITAL ROTARY SPECIAL EFFECTS GENERATOR

[75] Inventor: Albert E. Busch, Bloomington, Ind.

[73] Assignee: Sarkes Tarzian, Inc., Bloomington, Ind.

[22] Filed: Mar. 23, 1973

[21] Appl. No.: 344,094

[52] U.S. Cl............................. 178/6.8; 178/DIG. 6
[51] Int. Cl. ............................................. H04n 5/22
[58] Field of Search......................... 178/6.8, DIG. 6

[56] References Cited
UNITED STATES PATENTS

| | | | |
|---|---|---|---|
| 3,598,908 | 8/1971 | Poulett........................... | 178/DIG. 6 |
| 3,671,667 | 6/1972 | Thorpe........................... | 178/DIG. 6 |
| 3,758,712 | 9/1973 | Hudson........................... | 178/DIG. 6 |

*Primary Examiner*—Howard W. Britton
*Attorney, Agent, or Firm*—Mason, Kolehmainen, Rathburn & Wyss

[57] ABSTRACT

An improved special effects generator for television uses digital logic to achieve "windshield wiper," "propeller," and other similar rotational special effects. The generator is supplied with a number whose magnitude is proportional to the angular rotation of the desired special effect. Digital logic circuitry is used to compute the co-tangent of this number, to compute the product of this co-tangent with the Y-coordinate of each image point, and to compare the resulting product with the X-coordinate of each image point. The result of this comparison then signals whether each image point is derived from a first incoming video signal or from a second incoming video signal. Additional digital logic permits "fan" and "clock-hand" wipe effects to be achieved.

37 Claims, 20 Drawing Figures

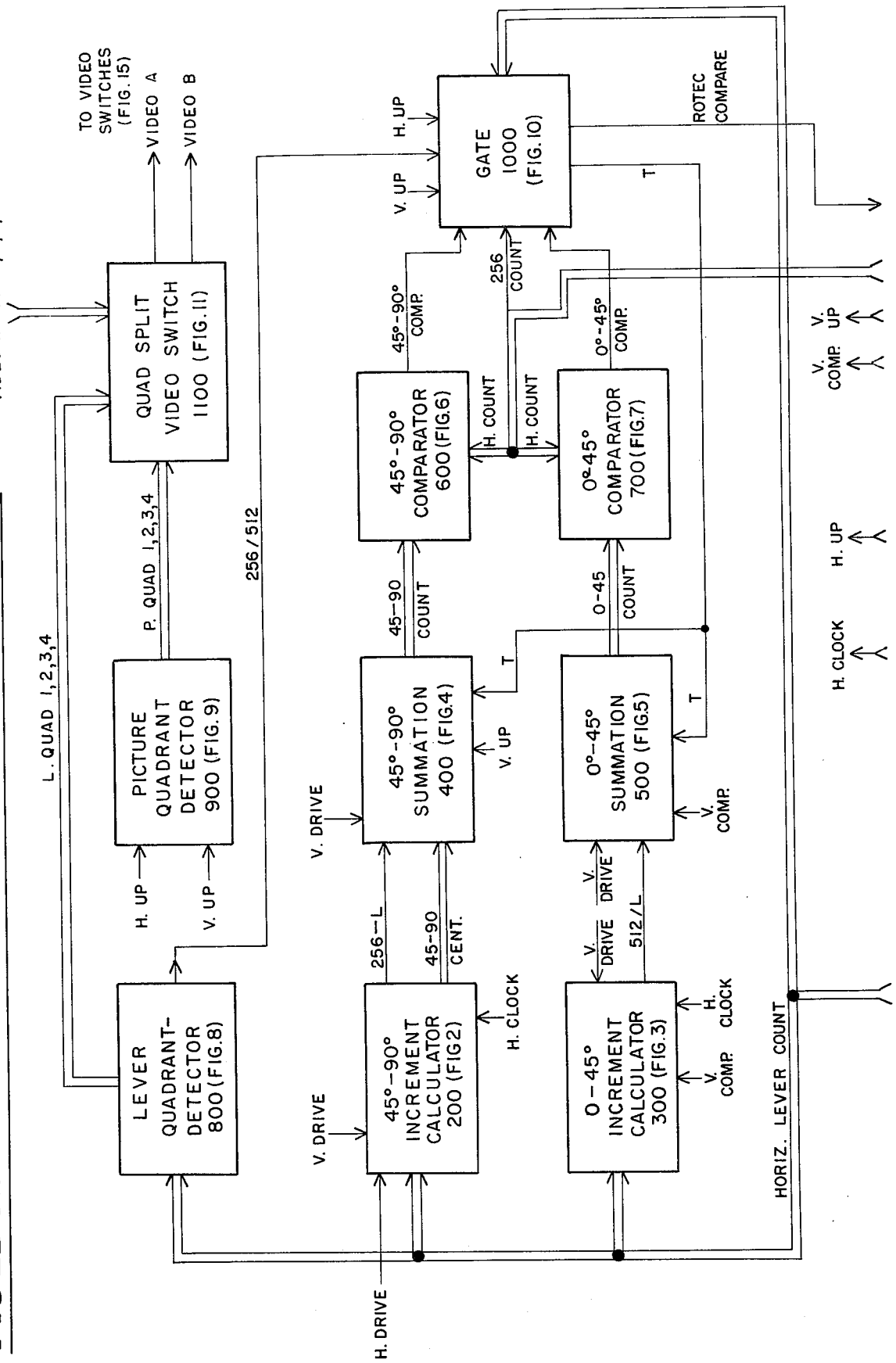
FIG.1B DIGITAL ROTARY SPECIAL EFFECTS GENERATOR

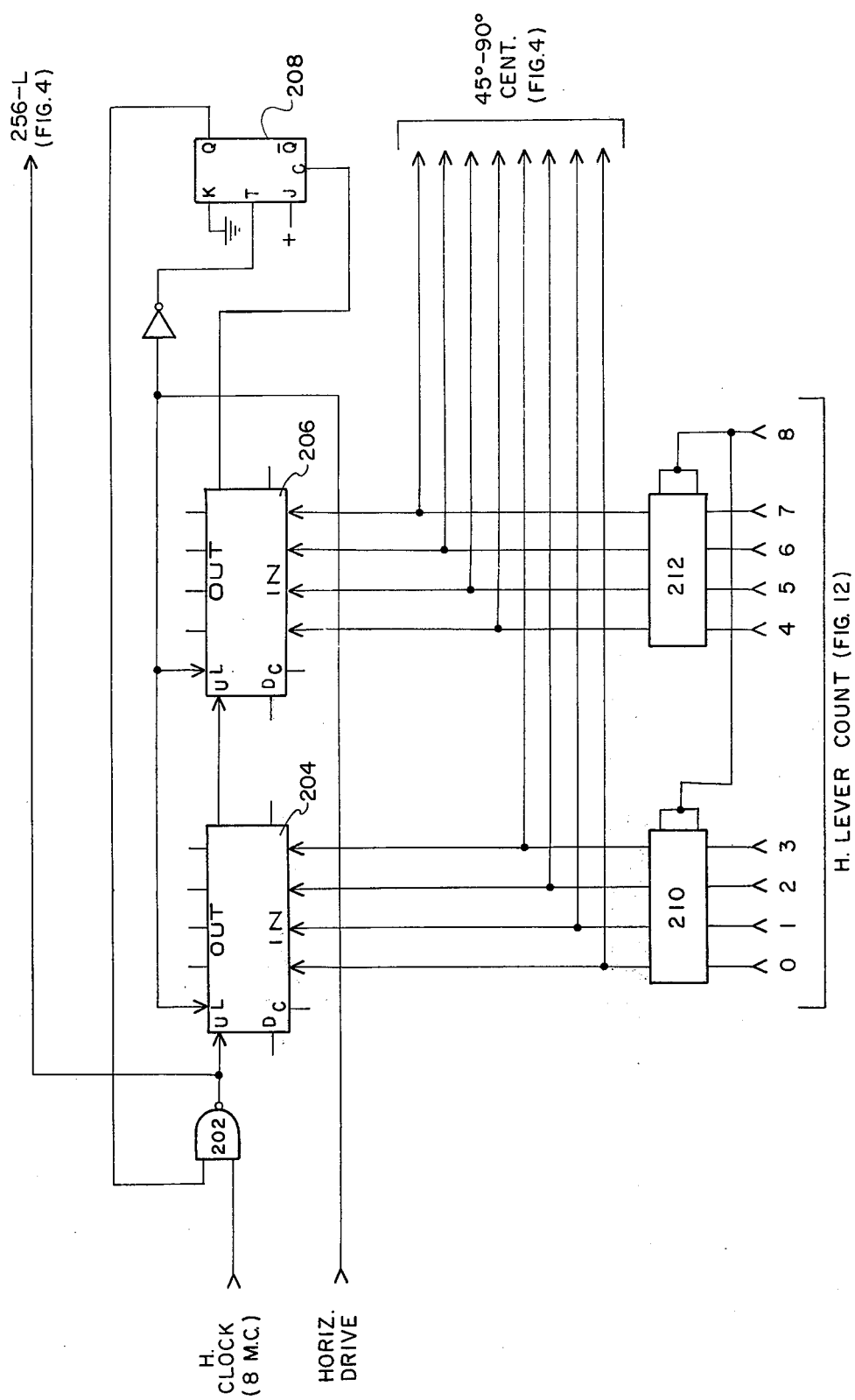

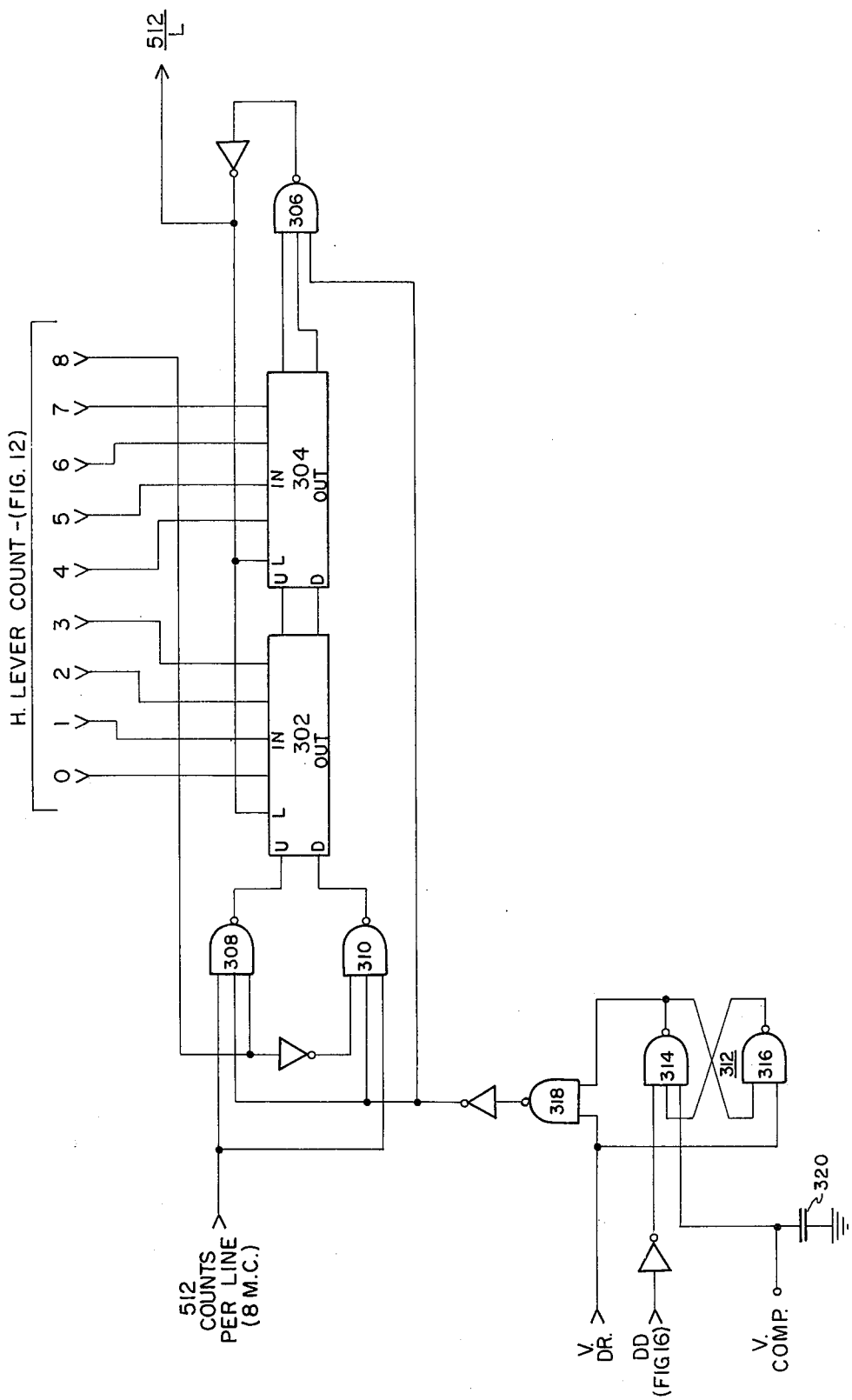
FIG. 3 0°-45° INCREMENT CALCULATOR 300

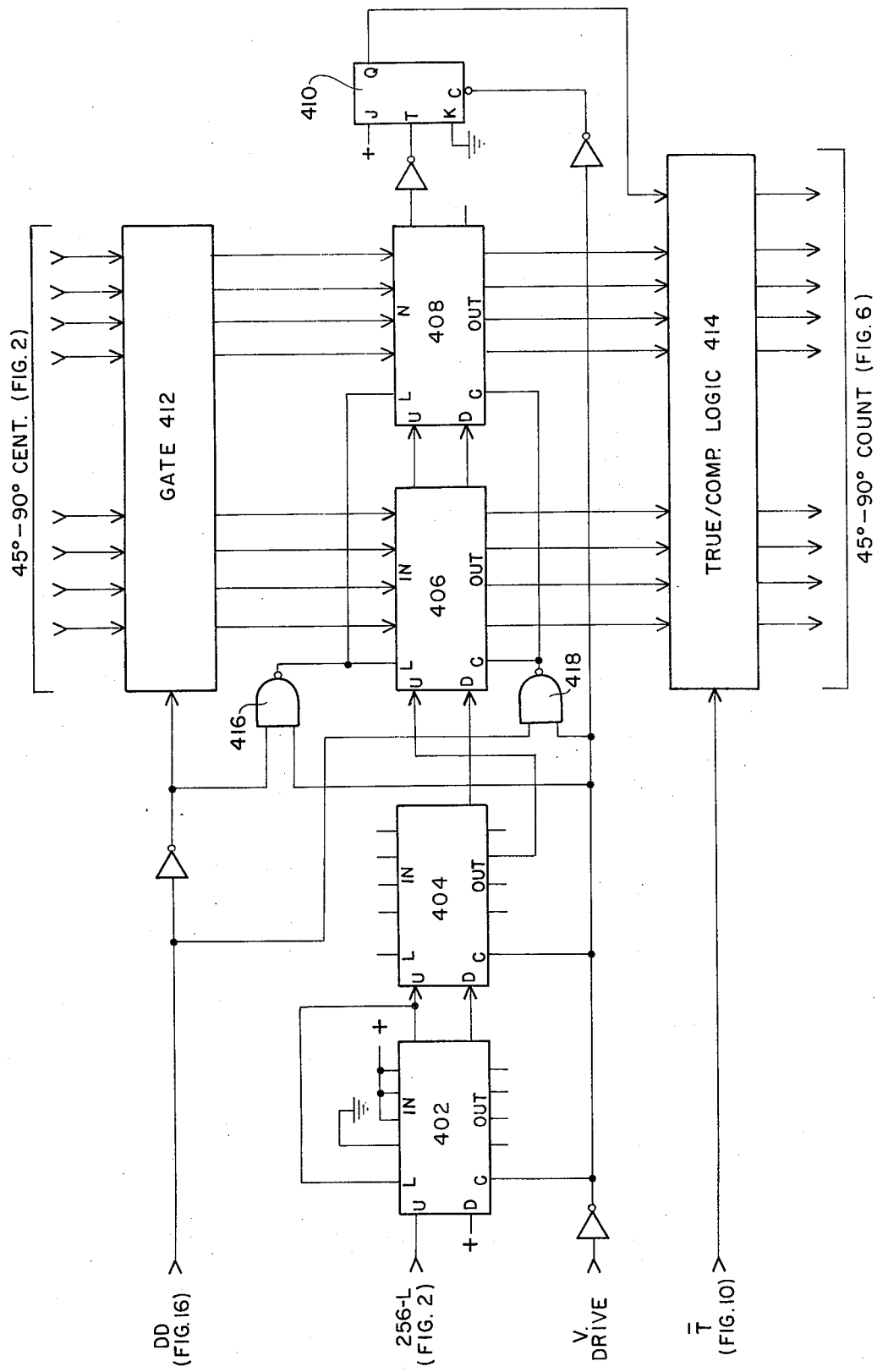

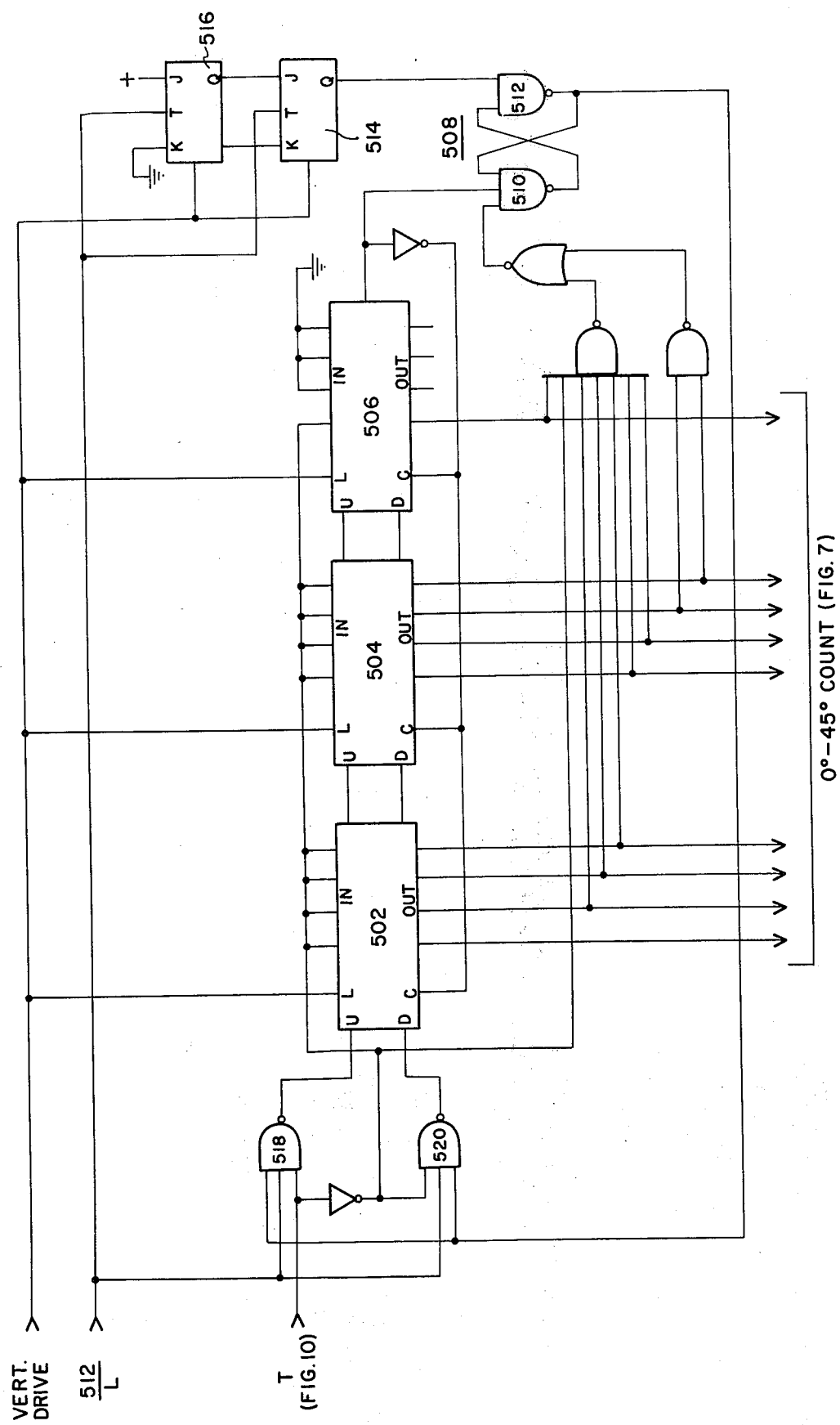
FIG. 5 — 0° TO 45° SUMMATION 500

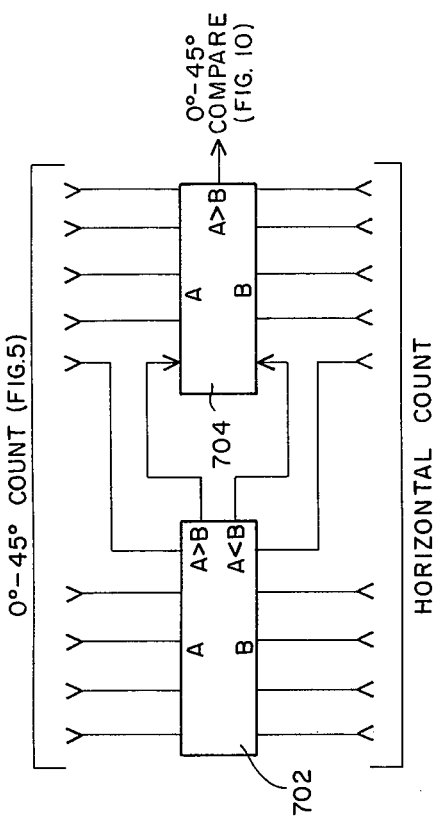
FIG. 6 - 45°-90° COMPARATOR 600
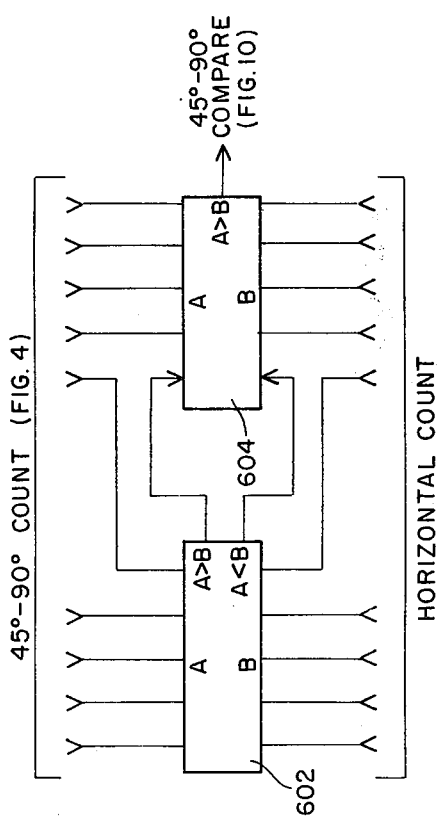
FIG. 7 - 0°-45° COMPARATOR 700
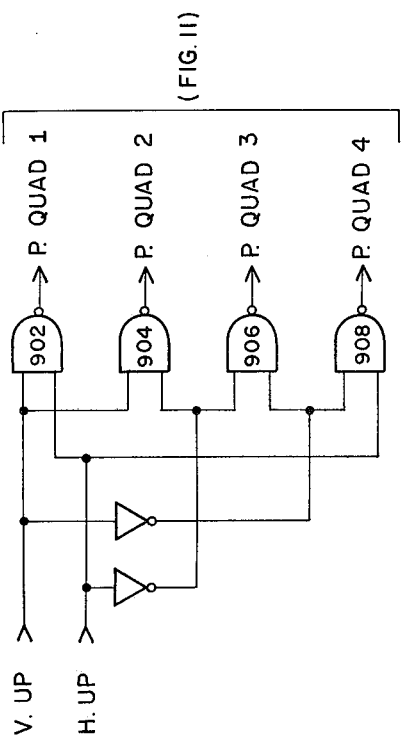
FIG. 9 - PICTURE QUADRANT DETECTOR 900
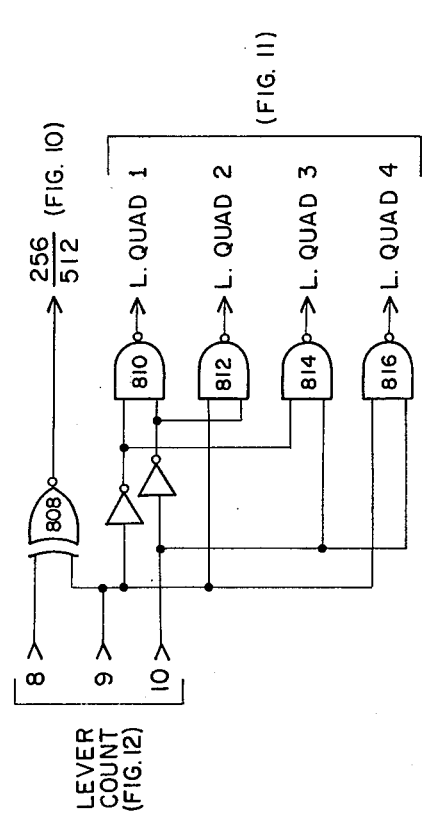
FIG. 8 - LEVER QUADRANT DETECTOR 800

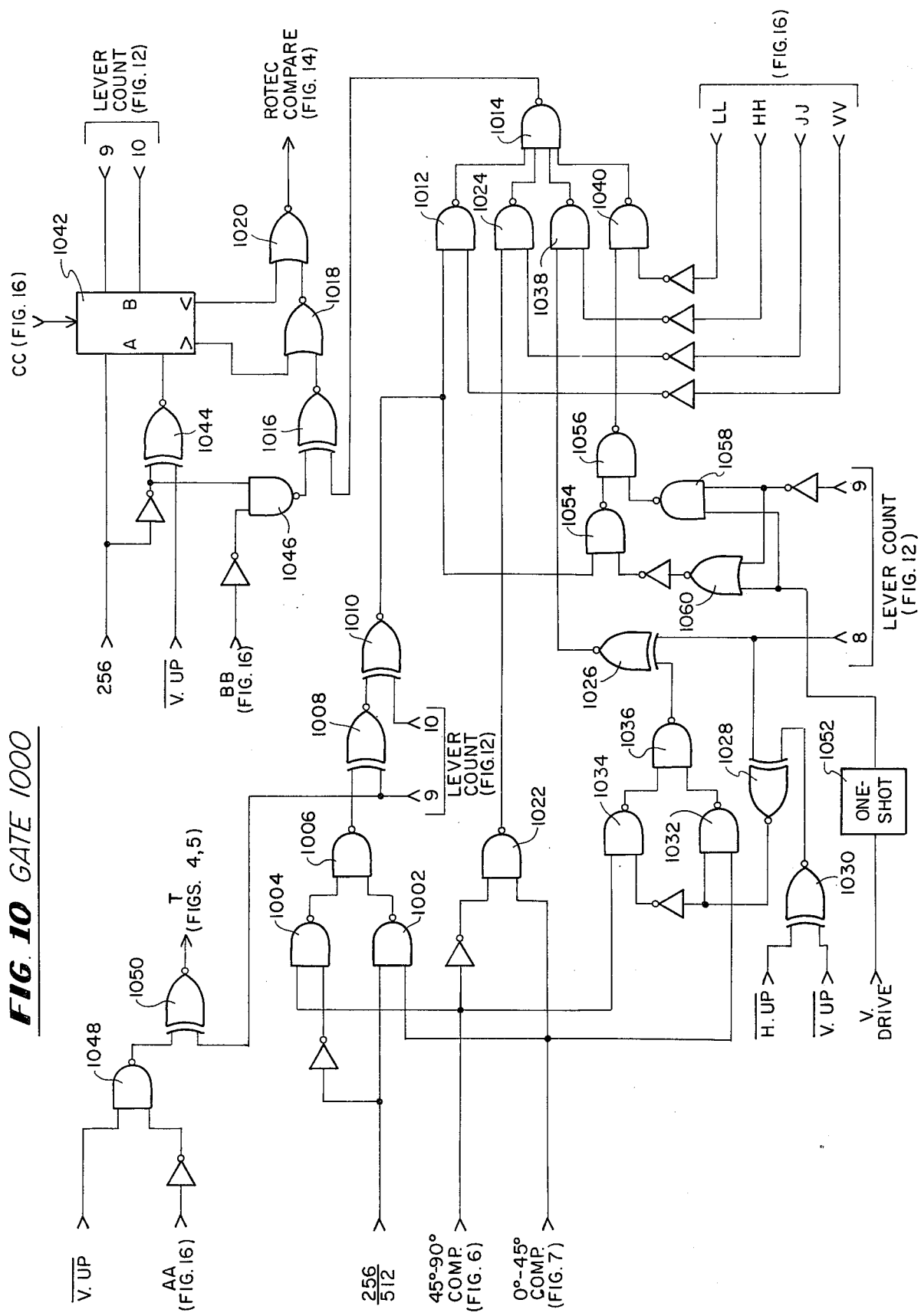
FIG. 10 GATE 1000

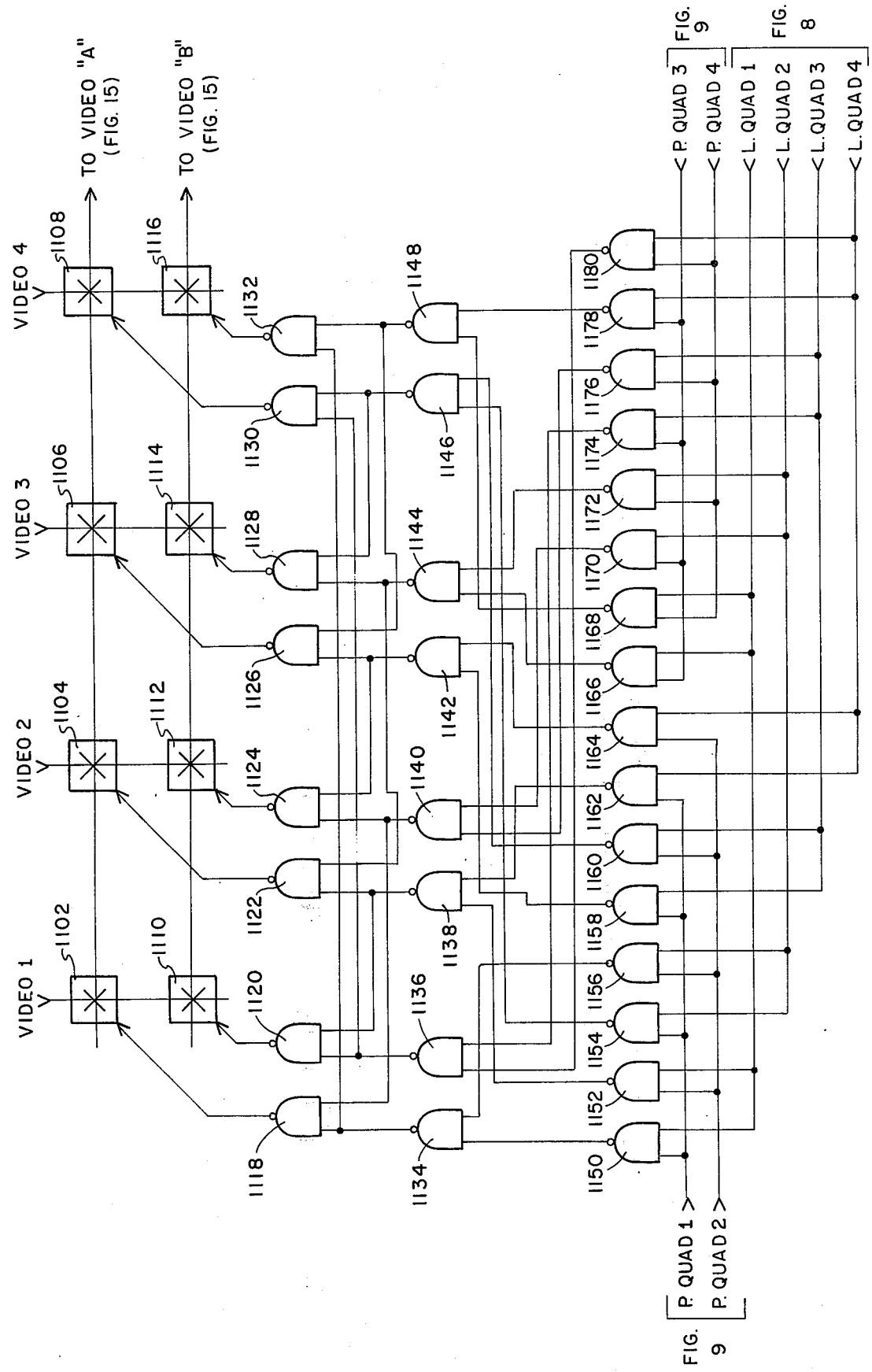

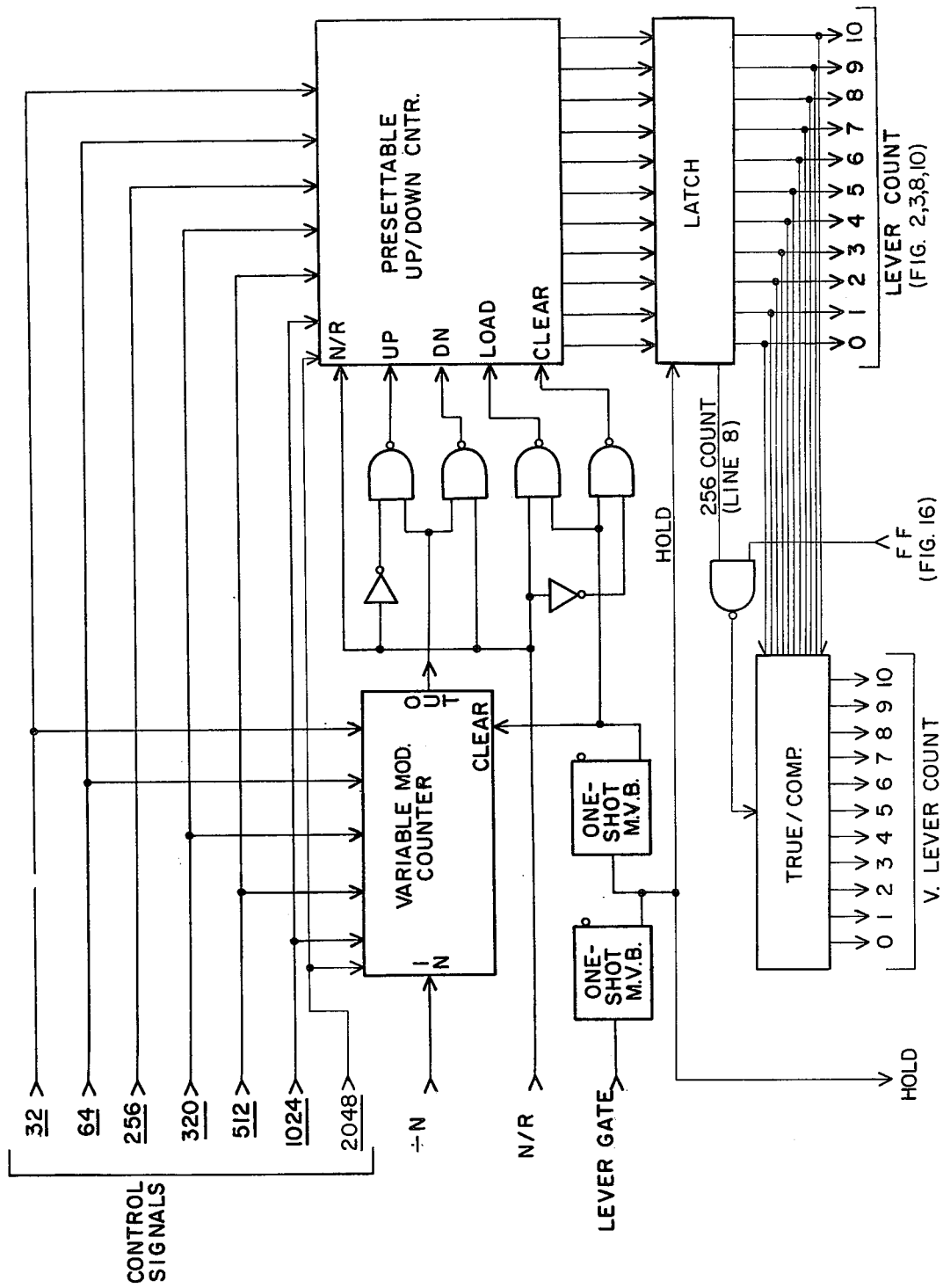

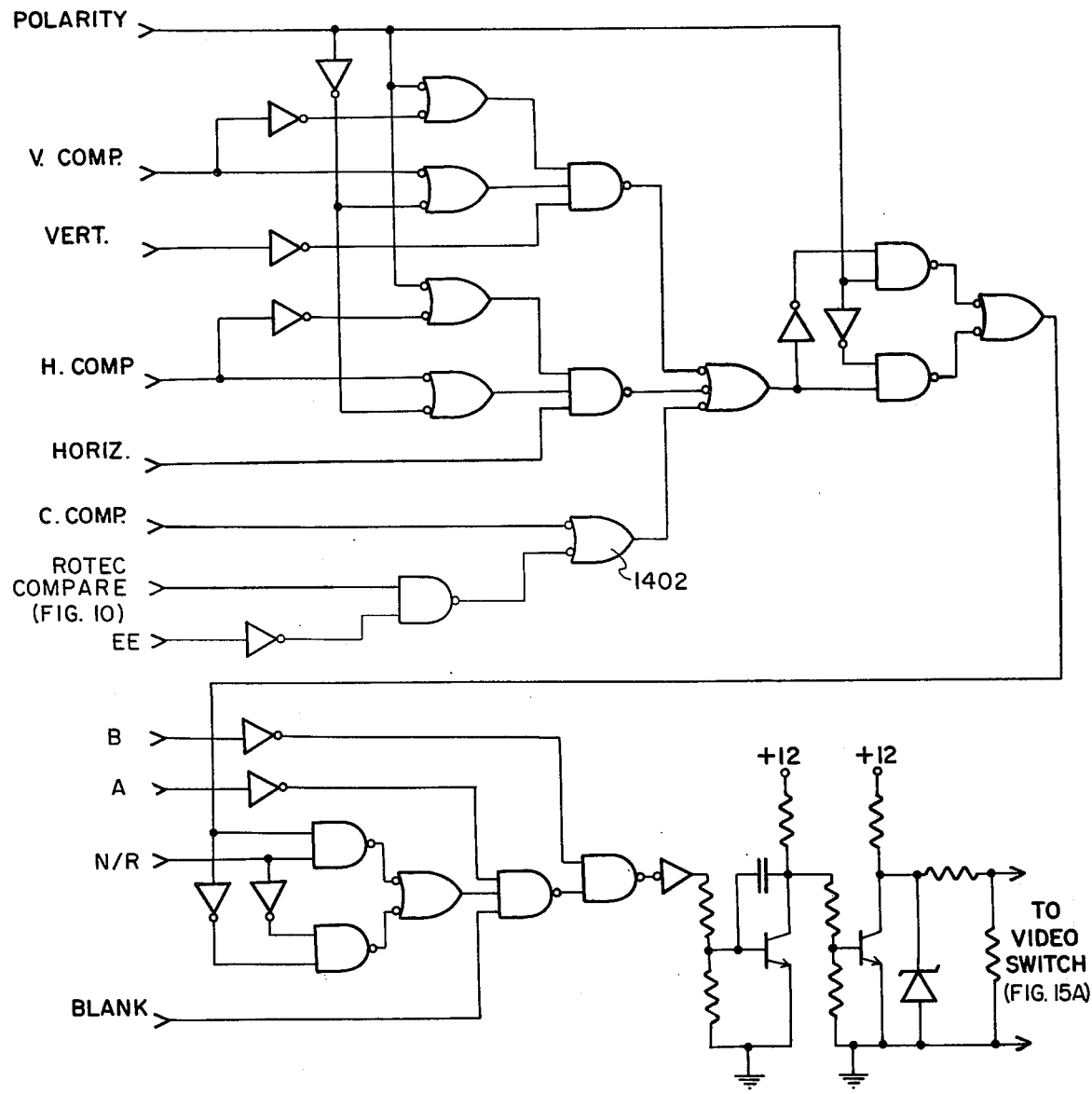

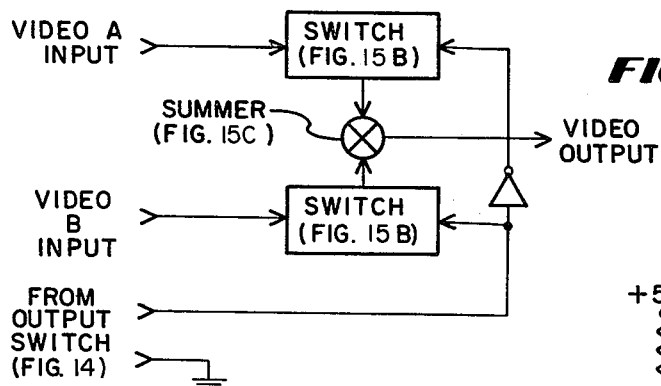
FIG. 15A - VIDEO SWITCHES
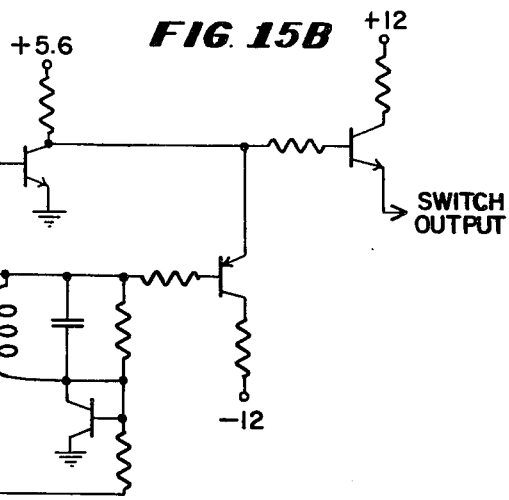
FIG. 15B
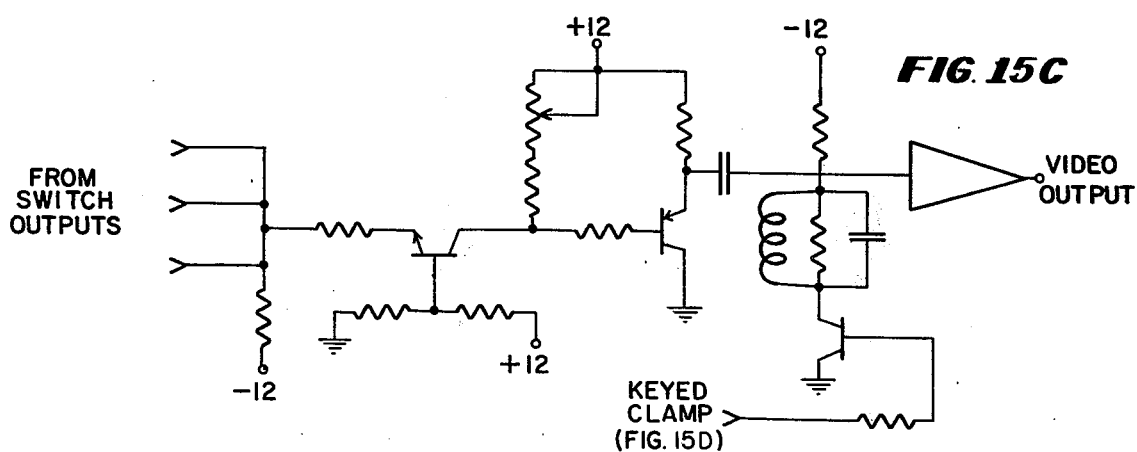
FIG. 15C
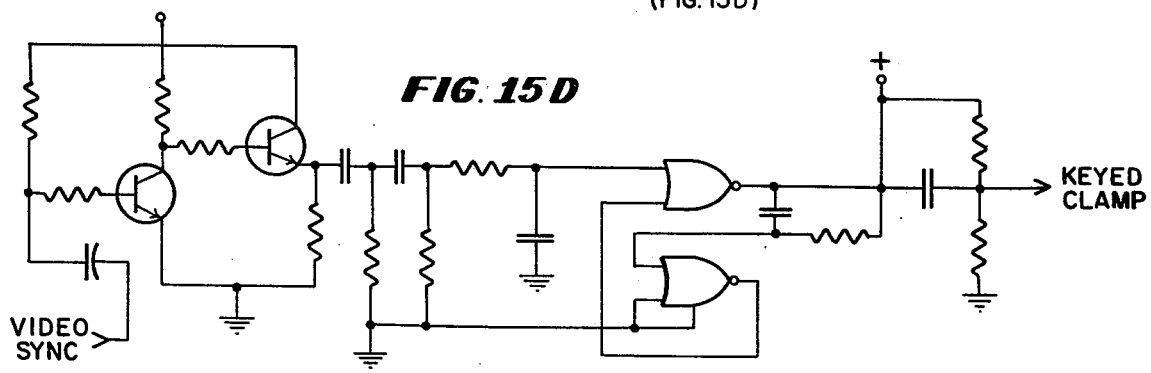
FIG. 15D

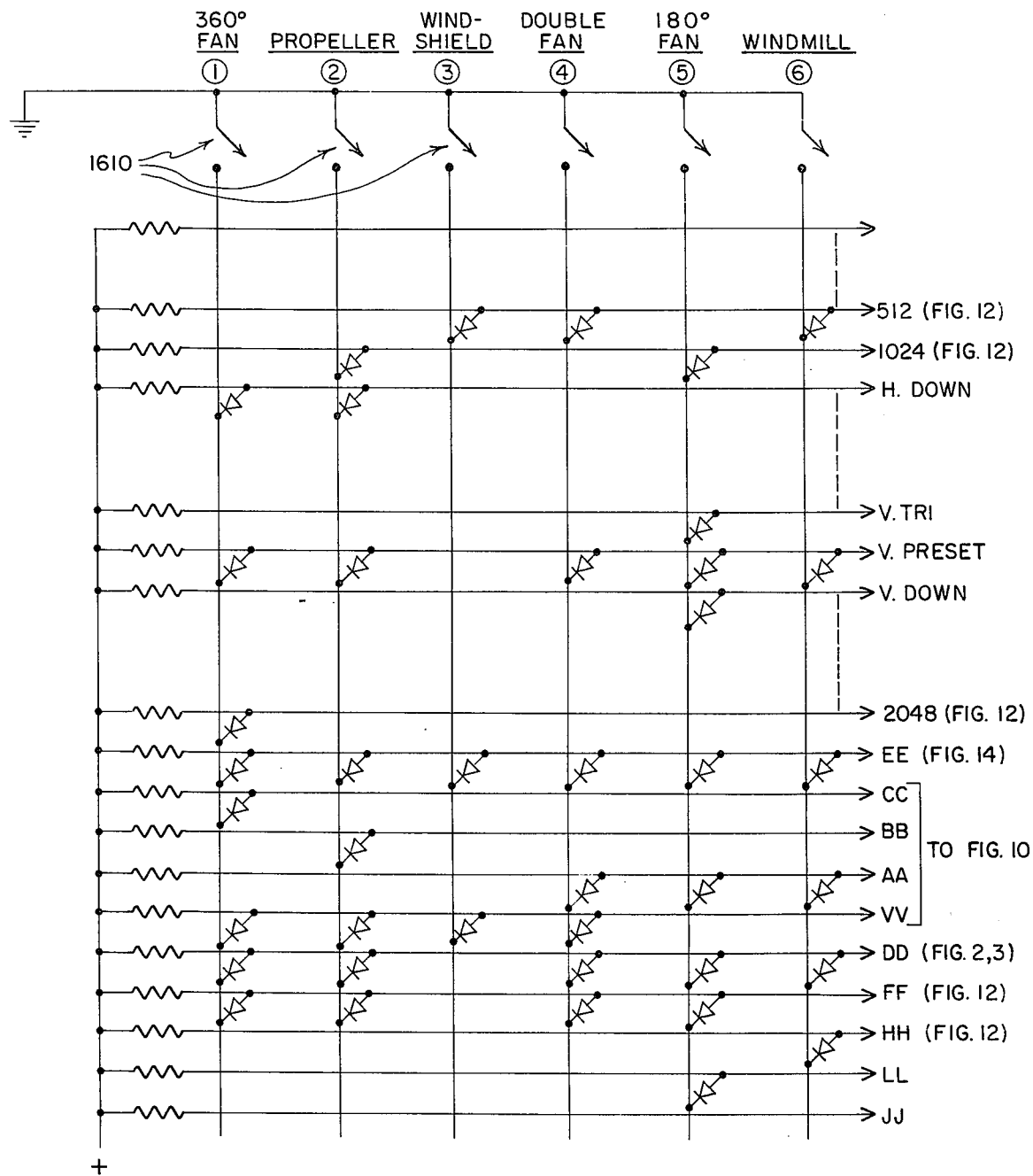
FIG. 16 - CONTROL SIGNALS 1600

DIGITAL ROTARY SPECIAL EFFECTS GENERATOR

CROSS-REFERENCE TO RELATED APPLICATION

Detailed descriptions of all the elements shown in FIG. 1A may be found in U.S. Pat. No. 3,758,712 which issued to John P. Hudson on Sept. 11, 1973.

BACKGROUND OF THE INVENTION

1. Field of the Invention

The present invention relates to television special effects generators of the type which may combine segments of several incoming video signals into a single output video signal. More particularly, the present invention relates to rotational special effects generators which are able to rotate the line or curve which separates adjacent image segments so as to achieve windshield wiper, propeller, fan, clock-hand, and other rotational special effects.

2. Brief Description of the Prior Art

Special effects generators are used in television studios to take portions of the signals generated by two separate television cameras or other video sources and to combine the portions into a single video signal. When the resultant signal is fed into a television image display device, the device generates a composite image which is composed of segments of the images captured by the two television cameras or sources. Typically, the image segments which comprise the composite image are separated from one another by straight lines which hereinafter are called "lines of separation". For example, a horizontal line of separation may separate an upper image segment derived from a first camera and a lower image segment derived from a second camera. Similarly, a diagonal line of separation may separate an upper triangular image segment from a first camera and a lower triangular image segment from a second camera. The slope of slant of a line of separation may conveniently be defined by the angle which the line makes with the horizontal.

The controls of a special effects generator are typically arranged so that the position of a line of separation may be shifted by moving a lever. A "wipe" is a special effect in which a line of separation moves progressively across the composite image, thus giving the illusion that one image segment is "wiping" another image segment right out of the composite image. Conventional special effect generators are typically able to generate horizontal, vertical, and diagonal wipe effects in which a line of separation moves up, down, or sideways but does not rotate.

The present invention has, as its primary object, the achievement of rotational wipe effects using digital logic circuitry. A rotational special effect is one in which a line of separation is free to rotate about a fixed point.

Patent application Ser. No. 131,300 filed by Nikola B. Tkacenko and assigned to the same assignee as the present application, now U.S. Pat. No. 3,812,286 which issued on May 21, 1974, describes analog circuitry which may be used to generate a limited number of rotational special effects. That application teaches how horizontal and vertical sawtooth waveforms may be mixed in varying quantities by a potentiometer so as to achieve a line of separation between image segments which may be rotated as the potentiometer is manually actuated. The analog circuitry used by Tkacenko is relatively satisfactory, and is entirely suitable for many applications. However, analog circuitry can be difficult to calibrate, since analog circuits for mixing sawtooth waveforms have to include a large number of adjustments. The Tkacenko device has to compare low level analog signals with one another. These low-level-signal comparisons can introduce small amounts of instability into the resultant special effects. When the Tkacenko circuitry is used to generate a "windmill" rotational effect, the center point of the "windmill" may typically be observed to "wobble" around a very small circular path rather than to remain absolutely stationary. It is an object of the present invention to provide a rotational special effects generator which is free from the somewhat undesirable features just listed.

U.S. Pat. No. 3,758,712 filed by John P, Hudson and assigned to the same assignee as the present application discloses a digital special effects generator. The digital generator disclosed in that application is far more stable and far easier to calibrate than are comparable analog special effects generators. Because digital circuits measure time intervals and not voltage levels, digital circuits are not subject to drift and require far fewer calibration adjustments than do comparable analog circuits. The present invention is an improved version of the basic digital special effects generator disclosed in the above mentioned application which is able to generate rotational effects in addition to other digitally controlled special effects. In addition to the increased stability which results from controlling rotational effects digitally, the present invention represents a considerable cost savings over the combination of a non-improved digital special effects generator with a conventional analog rotary special effects generator.

The development of digital logic circuitry for controlling the execution of rotational special effects required more than the construction of a digital version of prior analog arrangements. The analog technique of mixing sawtooth waveforms did not lend itself to digital implementation. A new approach to the problem was needed to provide digital circuitry capable of generating a line of separation whose angle with the horizontal can be varied linearly with the motion of a lever or the advancement of a digital counter.

SUMMARY OF THE INVENTION

A primary object of the present invention is overcoming the various deficiencies of the prior art arrangements just described. Another important object of the invention is the achievement of stable, drift-free rotational effects using digital circuitry. A secondary object is the achievement of a rotary special effects generator that is simple to calibrate and that does not require frequent recalibration.

In accordance with these and other objects, the present invention comprises briefly a digital special effects generator that is able to generate rotational wipe effects. A horizontal counter which advances during each horizontal scan and which is reset at the end of each horizontal scan generates a number proportional to the X-coordinate of each image point in each horizontal scan. A comparator compares this X-coordinate number with a computed number. If the X-coordinate number is larger than the computed number, the comparator connects a video signal output to a first video signal source. If the computed number is larger, the comparator connects the video signal output to a second video signal source. The computed number is digitally calculated to give the desired rotational special effect, as is explained in brief below. The computation of this number represents an important facet of the invention.

During each horizontal scan, the computed number is adjusted to equal the product of the Y-coordinate of the horizontal line which is being scanned multiplied by the tangent or cotangent of an angle, plus an optional constant. The angle is that which a line of separation is to make with the horizontal (tangent function used) or with the vertical (cotangent function used). Internally, this angle is represented by a number that is typically proportional to the position of a manually actuatable "rotation" or "wipe" control. Alternatively, the angle may be represented by a number that is generated by a controlled counter or even by a computer. Fully automated rotational special effects may thus be achieved with the present invention.

The present invention utilizes novel digital circuitry which is able to compute approximately the tangent or cotangent of an angle. Two different approximations are used, depending upon the size of the angle. For an angle between 0° and 45°, the cotangent of the angle is assumed to be proportional to the reciprocal of the angle size. For an angle between 45° and 90°, the cotangent of the angle is assumed to be directly proportional to the difference between the angle size and 90°. In both cases, the constant of proportionality is chosen to give an accurate result and a smooth transition between the two approximations at 45°. Similar approximations are also used for other angles between 90° and 360°, as is explained in the detailed description which follows. This approximation is close enough so that no observable distortion or nonlinearity is introduced into any rotational special effects. The tangent of an angle may be computed in a similar manner.

Rather than computing the Y-coordinate of each scanning line directly and then multiplying the Y-coordinate value by the tangent or cotangent of the desired line-of-separation angle to give the desired computed number, the preferred embodiment of the invention simply computes the amount by which the Y-coordinate-value-times-tangent-or-cotangent product changes from one scanning line to the next and adds this amount into a summation circuit or accumulator which serves as a reservoir for the computed number. A pair of "increment calculators" are established to compute the tangents or cotangents. Each increment calculator accepts a number proportional to the desired line-of-separation angle as an input and then supplies pulses to a summation circuit or accumulator at such a pulse repetition frequency that the computed number is always maintained at the proper value for achieving the desired line-of-separation angle. A first increment calculator and summation circuit are used for angles from 0° to 45°, 135° to 180°, etc., and a second increment calculator and summation circuit are used for angles from 45° to 90°, 90° to 135°, etc.

Briefly described, the first increment calculator comprises a counter which counts from an initial count proportional to the desired angle up or down to a final count value and which repeats this process over and over. This counter supplies a pulse to its associated summation circuit each time it repeats this process. The second increment calculator comprises a counter which also counts from an initial count proportional to the desired angle up or down to a fixed count value but which does so only once during each horizontal scanning interval. All of the pulses which are fed into this second counter are also fed through a scaler or count-divider and into an associated summation circuit. Logic is provided for determining which of the summation circuits contains the more accurate result, for comparing the computed number within that summation circuit to a horizontal count value, and for switching the video in accordance with the result of this comparison, as has been explained.

The detailed description that follows illustrates how six different specific rotational effects may be achieved. All of the illustrative effects are wipe effects utilizing rotatable lines of separation between adjacent image segments. While not illustrated in detail, a seventh rotational special effect is described in which segments from four video images are combined into a single visual image. The four image segments are separated by two mutually perpendicular lines of separation that intersect at the center of the composite image. The lines of separation may be freely rotated.

It would unduly prolong this brief summary to describe at this point the specific circuitry which is used to achieve specific special effects, such as fan wipes and propeller wipes. A complete and detailed explanation of how a variety of interesting rotational effects may be achieved is presented in the detailed description which follows along with additional objects and advantages of the invention. The features of novelty underlying the invention are described with particularity in the claims annexed to and forming part of this specification.

BRIEF DESCRIPTION OF THE DRAWINGS

For a better understanding of the invention, frequent references will be made to the drawings wherein:

FIG. 1B is a block diagram of a rotary special effects generator logic which enables a digital special effects generator to generate a variety of rotational special effects;

FIG. 2 is partly a block and partly a logical diagram of an increment calculator which forms a block element of FIG. 1B;

FIG. 3 is partly a block and partly a logical diagram of another increment calculator which also forms a block element of FIG. 1B;

FIG. 4 is partly a block and partly a logical diagram of the 45° to 90° summation circuitry which forms a block element of FIG. 1B;

FIG. 5 is partly a block and partly a logical diagram of the 0° to 45° summation logic which forms a block element of FIG. 1B;

FIGS. 6 and 7 each illustrate the details of digital comparators which form block elements of FIG. 1B;

FIG. 8 is a logic diagram of a lever guadrant detector which is an element of FIG. 1B and which determines the quadrant that a line of separation is to fall into;

FIG. 9 is a logic diagram of a picture quadrant detector which is an element of FIG. 1B and which determines the quadrant of a video image that is being scanned at any given moment in time;

FIG. 10 is a logic diagram of gating logic which appears as a block element of FIG. 1B and which generates a ROTEC COMPARE signal;

FIG. 11 is a logic diagram of a high speed video switching circuit which may be used to generate special effects involving more than two incoming video signals;

FIG. 12 is a block diagram of a lever counter which appears as a block element of FIG. 1A and which illustrates modifications which are made to the lever counter in a conventional digital special effects generator;

FIG. 14 is partly a schematic and partly a logical diagram of an output switch which appears as a block element of FIG. 1A and which illustrates how the ROTEC COMPARE signal may be used to control the operation of a video switch;

FIGS. 15A through 15D illustrate using block, logical, and schematic diagrams the constructional details of a conventional video switch which may be used in implementing the present invention; and FIG. 16 is a schematic diagram illustrating how a series of manually actuatable switches may be arranged to generate the control signals which form a block element of FIG. 1A.

DETAILED DESCRIPTION OF THE PREFERRED EMBODIMENT

I. TERMINOLOGY

Figure 1A:
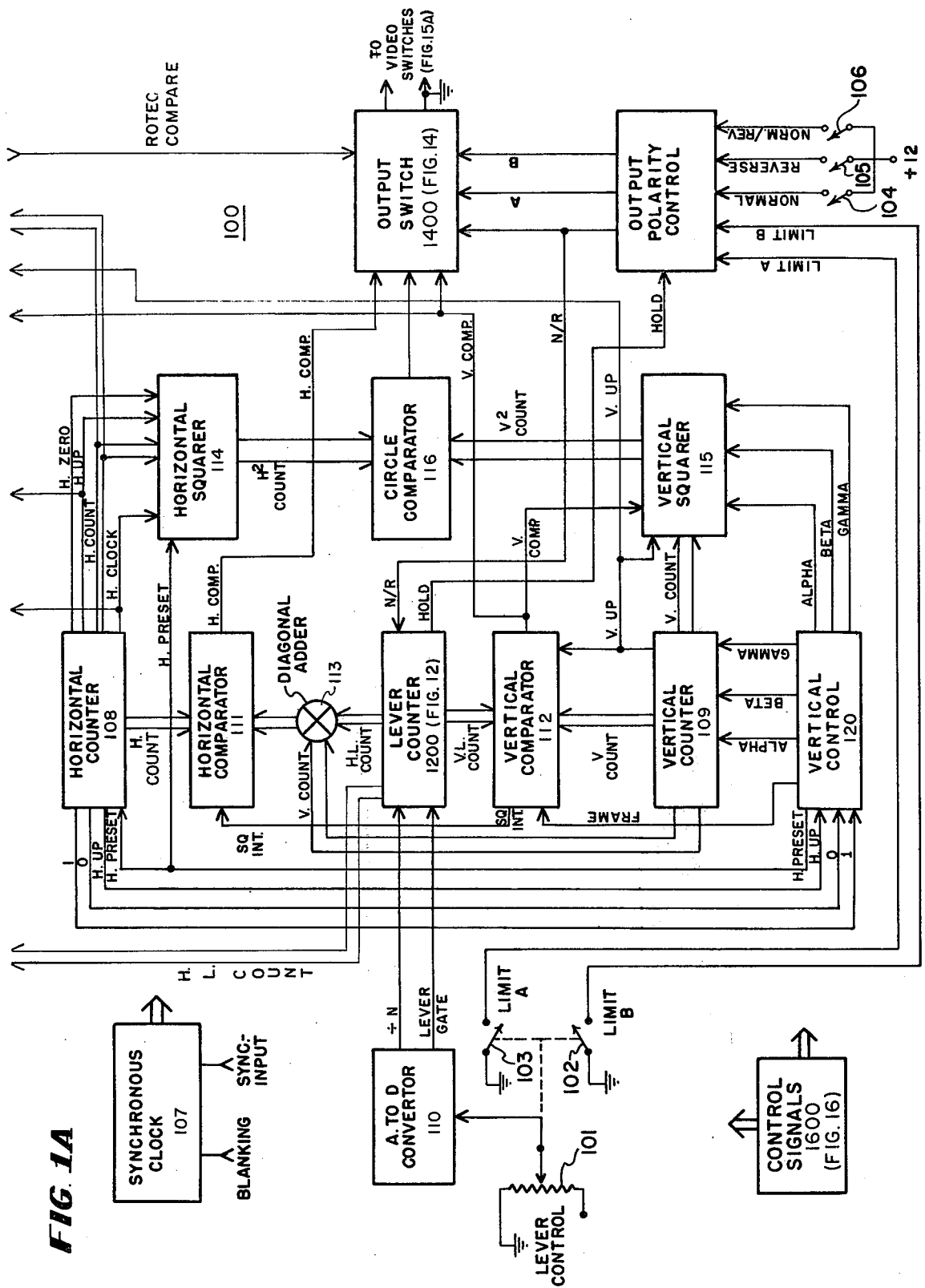
FIG. 1A is a block diagram of a digital special effects generator which has been modified to cooperate with the rotary special effects generator logic that is illustrated in FIG. 1B.

In the detailed description which follows, the following definitions shall apply.

A "video signal" or a "composite video signal" is a signal which may be supplied to a television display device and which causes the display device to generate a visible picture. For the purpose of illustrating the present invention, a video signal is assumed to present sufficient information to cause the generation of a complete picture of "frame" containing 525 visible horizontal lines or scans each 1/30th of a second. Each such frame is assumed to include two independent "fields". Each field is assumed to include 262½ lines and is assumed to be generated in 1/60th of a second. Successive fields are assumed to "interlace" with one another so that the lines which comprise one field are displayed in between the lines which comprise the immediately preceding and following fields. It is to be understood that the present invention may also be used with other forms of video signal than that which is assumed for illustrative purposes.

The picture which is created by a television display device in response to the reception of a single field is called a "video image" or "image". For the purposes of the discussion which follows, and image by definition contains a single field of 262½ lines. The ratio of the height to the width to the diagonal of an image is assumed to be 3 to 4 to 5. The center point of an image may be arbitrarily defined as having the X and Y coordinates (0, 0) with the X axis horizontal and the Y axis vertical. The coordinates of any point in a video image may be indicated by a pair of numbers, for example 26, 50 where 26 is the X-coordinate of the point and 50 is the Y-coordinate of the point. Generally, the coordinates of a point at the center of the right-hand edge of an image are defined to be 256, 0, and an image is thus 512 units wide. Using these same units, the coordinates of a point at the upper edge of an image is 192, 0, and an image is thus 384 units high. The diagonal distance from the center of an image to any corner is then 320 units of the same scale. The numbers 192 and 256 and multiples of these numbers appear frequently in the discussion which follows.

A "composite video signal" by definition includes "synchronizing pulses" or "sync pulses" -- horizontal synchronizing pulses at the start of the signal representation for each horizontal line, and vertical synchronizing pulses at the start of the video signal representation for each field. A "video signal" may contain sync pulses, but does not have to contain such pulses. A "synchronizing signal" or a "sync signal" contains horizontal and vertical synchronizing pulses and no other video information. A "blanking signal" is a signal which is at a high level during horizontal and vertical retrace intervals when the scanning spot of a television display device "retraces" an image to position itself for the next scan. A blanking signal is usually present in a composite video signal. Horizontal and vertical drive signals are signals which are present during scanning intervals and absent during blanking intervals. A horizontal drive signal is absent during horizontal retrace blanking intervals, and a vertical drive signal is absent during vertical retrace blanking intervals.

The preferred embodiment of the present invention is designed to accept as inputs a sync signal, a blanking signal, horizontal and vertical drive signals, and at least two video signals which present image segments for inclusion into an internally generated composite output signal. If at least one of the video input signals is a "composite video signal," then it is to be understood that conventional circuitry can be used to extract a horizontal drive signal, a vertical drive signal, a synchronizing signal, and a blanking signal from the composite video signal, so that separate sources of these other signals are then not required. The use of a blanking signal in conjunction with the present invention is optional, and may be dispensed with, if desired. Separate sources of horizontal drive, vertical drive, video sync, and blanking signals are usually available in commercial television studios, and the preferred embodiment of the invention takes advantage of these readily available signal sources.

A "television receiver" or "television display device" is any device capable of generating an image that represents the information content of a video signal. Different "segments" of the resultant image correspond to the information presented by the video signal at different times. It is possible, by rapidly switching a television display device between a number of incoming video signals, to have the device produce an image containing segments corresponding to each of the incoming signals. All that one has to do to produce an image containing any desired combination of image segments is to provide means to insure that each of the incoming video signals is connected to the display device at the moment in time when the display device is "scanning" or generating the image segment which is to correspond to that video signal. A device which switches several incoming video signals to a single display device to produce a segmented image is called a "special effects generator."

Figure 13:
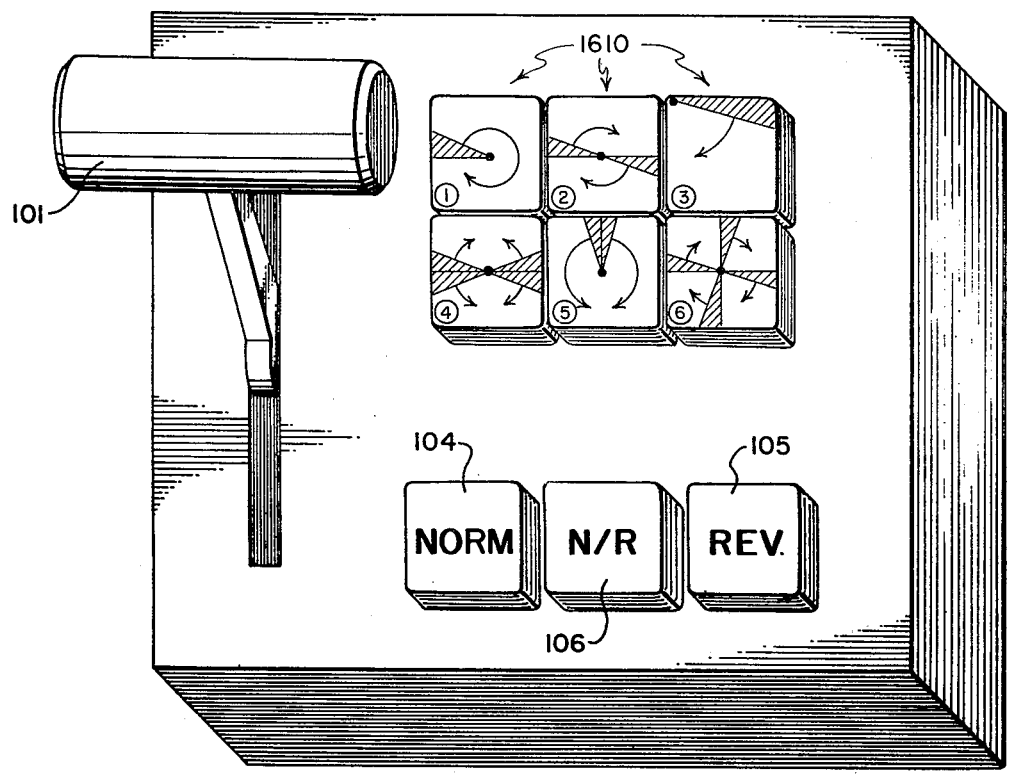
FIG. 13 is an oblique plan view of a control panel which is suitable for use in controlling the present invention and which includes manually actuated push-buttons for selecting particular rotational special effects and also a manually actuatable lever which may control the progress of any given rotational special effect.

"Lines of separation" are lines which separate image segments from one another. While in general lines of separation may be curved lines, in the preferred embodiment of the present invention image segments are always separated from one another by straight lines. Lines of separation are not dark or light lines but are simply the lines defined by the adjacent edges of image segments. They thus may or may not be visible in accordance with the nature of the adjoining segments. In FIG. 13, the lines of separation between the adjacent image segments are represented symbolically on the push-button switches 1610 as heavy black lines. A first image segment is drawn clear and a second is drawn cross-hatched on the push-button switches 1610 so that the two image segments are easy to distinguish from one another.

Since the present invention relates to rotational special effects, it is contemplated that the lines of separation may be rotated through the actuation of a manually actuatable lever 101 which appears in FIG. 13. As a line of separation rotates, it rotates about a definite center point which, in the preferrerd embodiment of the invention, is either the center or a corner of an image. Other embodiments of the invention may be designed to use other center points.

A line of separation may be either horizontal, vertical or oblique. If it is oblique, its angular position is defined by the angle through which a horizontal reference line would have to be rotated in a counter clockwise direction until the rotated line becomes parallel to the line of separation. Hence, a line of separation which departs from the vertical by 30° and the upper end of which angles to the right may be described as a line at an angle of 60°, since a horizontal line would have to be rotated in a counter-clockwise direction through an angle of 60° before it would be parallel to such a line of separation. The position and location of a line of separation is completely defined by specifying its center point coordinates and its angle of rotation.

In addition to defining the slope of a line of separation by an angle measured in degrees, the slope of a line of separation may also be defined by an arbitrary digital count. Hence, a 360° rotation may be arbitrarily represented by a count of 2048, and lesser angles of rotation may be arbitrarily represented by proportionally smaller counts. A 45°angle may be represented by a count of 256, and a 90° angle may be represented by a count of 512. Angles are actually represented by digital counts in this manner within the preferred embodiment of the invention.

In the descriptions that follow, the names of signals ae spelled out using all capital letters. In the figures, logic diagrams are used to represent the logical functions carried out by circuit elements, and detailed circuit diagrams of the individual logic elements are not provided. This is in accordance with the customary practice of digital logic circuit designers. To simplify the discussion as much as possible, signals are described as being present or as being absent and are said to flow through logic gates whenever they are present. The particular polarity (inverted or non-inverted; positive or negative) of any given signal at any point in a circuit is fully disclosed in the drawings and is therefore not normally mentioned in the discussions which follow.

If a gate is used to control the passage of a signal, the gate is said to be "enabled" to pass the signal when other signals are simultaneously supplied to all of its remaining inputs. Otherwise, the gate is "disabled" and blocks passage of the signal. If the function of a gate is to channel two or more signals into a single signalling line, the gate is described simply as one through which all incoming signals are free to pass. Inverting gates which do nothing more than invert a signal are typically not supplied with reference numbers and are not mentioned in the discussion. All gates are shown in the drawings, however, precisely as they appear in the preferred embodiment of the invention.

Numerous transistor-transistor-logic (TTL) elements are used in constructing the present invention, and all such elements are conventional. In addition to conventional J-K flip-flops, AND gates, OR gates, NOT or inverting gates, and EXCLUSIVE-OR gates, the preferred embodiment of the present invention uses the following more-or-less specialized logic elements which may be purchased from Texas Instruments, Incorporated, of Dallas, Texas:

| PART NO. | DESCRIPTION |
| --- | --- |
| 74193 | up-down presetable counter |
| 7487 | true/complement and 1/0 gates |
| 74121 | one-shot multivibrator |
| 9324 | logical comparator |
| 7483 | four-bit latch |

In addition, FIG. 11 includes elements 1102, 1104, etc. which may be any form of high-speed conventional video switching logic circuitry and which may be constructed in accordance with FIGS. 15A-D. Naturally, appropriate modifications would have to be made to the switches shown in FIG. 15A and to the summer shown in FIG. 15C so that they could accept the additional inputs called for by FIG. 11.

II. OVERVIEW OF THE INVENTION

The preferred embodiment of the present invention is an improved version of a digital special effects generator. This digital special effects generator is fully described in the patent application Ser. No. 238,077 which was filed by John P. Hudson on Mar. 27, 1972 and which matured into U.S. Pat. No. 3,758,712 on Sept. 11, 1973. The specification (beginning at line 23 of column 5 and continuing on through line 2 of of column 43) and drawings of that patent are hereby incorporated by reference into the present application. Since a full and complete description of the digital special effects generator shown in FIG. 1A is presented in the above patent, it is unnecessary to repeat that description in its entirety at this point. A brief overview description of the digital special effects generator shown in FIG. 1A is presented in the paragraphs which follow.

A. DIGITAL SPECIAL EFFECTS GENERATOR

A block diagram of the digital special effects generator is presented in FIG. 1A. The digital logic shown in FIG. 1A controls the operation of a video switch appearing in FIG. 15A and causes one or the other of two video signals VIDEO A and VIDEO B to be fed through a summer to a composite video output.

A horizontal counter 108 counts continuously during each horizontal scan and is reset at the end of each horizontal scan. A vertical counter 109 counts continuously during each vertical scan and is reset at the end of each vertical scan. Together, the count values within these two counters define the horizontal and vertical coordinates of the image point the intensity of which is being transmitted at any given moment. A synchronous clock circuit 107 controls the operation of the two counters 108 and 109 and also synchronizes most other operations of the digital special effects generator. While normally the horizontal counter 108 counts from 256 down to zero and up to 256 and while normally the vertical counter 109 counts from 192 down to zero and up to 192, he achievement of particular special effects may require the horizontal and vertical counters to be preset to different initial values than 192 and 256 and may call for periodic reversals of the direction of count, as is fully explained in the patent cited above.

The execution of special effects is controlled by a manually actuatable lever control potentiometer 101. The lever control 101 supplies a variable DC voltage to an analog-to-digital converter 110 in accordance with the position of the control 101 (see FIG 13). The converter 110 generates during each vertical scanning interval a series of pulses at a rate that is directly proportional to the setting of the lever control 101 and supplies these pulses to a "divide by N" signal line. These pulses are counted by a lever counter 1200. In response to a lever gate signal that is generated by the converter 110 at the end of each vertical scanning interval, the total number of counts recorded by the lever counter 1200 is presented as a binary number to a series of signal lines which are called the H.L.COUNT (horizontal lever count) and the V.L.COUNT (vertical lever count) signal lines. The signals on these signal lines control the generation of a wide variety of wipes and special effects. Insofar as non-rotational special effects are concerned, the signals H.L.COUNT and V.L.COUNT are identical to one another.

A large number of interesting wipes and special effects may be achieved using the circuitry shown in FIG. 1A. Just a few of these special effects are described in the paragraphs that follow, and information on other special effects may be found in the Hudson patent cited above and at the start of this specification.

A horizontal wipe effect is achieved by simply feeding the H.S.COUNT signal output of the lever counter 1200 and the H.COUNT output of the horizontal counter 108 into a horizontal comparator 111. An H.COMP. (horizontal comparison) output signal generated by the horizontal comparator 111 indicates when the horizontal counter 108 output is greater in magnitude than the lever counter 1200 output. The H.COMP. signal causes an output switch 1400 to switch the composite output signal away from the VIDEO A input and to the VIDEO B input when the horizontal counter output exceeds the lever counter output. In this manner, a horizontal wipe effect is achieved and is controlled by the positioning of the lever control 101. The line of separation between image segments is vertical in this case.

A vertical or guillotine wipe effect is achieved in an analogous manner by a vertical comparator 112. The comparator 112 compares the output of the lever counter 1200 with the output of the vertical counter 109 and generates a V.COMP. (vertical comparison) output signal to indicate when the vertical counter 109 count exceeds the lever counter 1200 count. Diagonal wipes of 45° are achieved using the horizontal comparator 111 by using a diagonal adder 113 to add the lever counter 1200 output to the vertical counter 109 output before feeding the resultant sum into the horizontal comparator 111.

Circular and elliptical special effects may be generated with the assistance of horizontal and vertical squarer circuits 114 and 115 which respectively square the outputs of the horizontal and vertical counters 108 and 109. The outputs of the squarers 114 and 115 are fed into a circle comparator 116 which causes the output switch 1400 to switch between the VIDEO A and VIDEO B inputs at the proper time to achieve circular and elliptical wipe effects. The horizontal squarer 114 operates continuously to generate the square of the horizontal counter output. The vertical squarer 115 is placed into operation by the vertical comparator 112 when the vertical counter and lever counter outputs are equal. The vertical squarer 115 output thus represents the difference between the square of the vertical counter output and the square of the lever counter output.

Operation of the special effects generator shown in FIG. 1A is controlled by push-button-generated control signals 1600 (FIG. 16) that are fed into most of the elements shown in FIG. 1A. A vertical control 120 synchronizes the performance of the various elements shown in FIG. 1A, and also takes into account the problems caused by the interlacing of successive fields. An output polarity control and lever control limit switches 102 and 103 program the output switch 1400 so that wipes always proceed in the same direction. Push-button switches 104 and 105 determine whether wipes proceed in a first normal direction or in a second reverse direction, and a push-button switch 106 defeats the normal operation of the output polarity control.

B. GENERATION OF ROTATIONAL SPECIAL EFFECTS

The achievement of digital rotational special effects is accomplished by adding the additional elements shown in FIG. 1B to the special effects generator shown in FIG. 1A. The various block elements of FIG. 1B accept as inputs the signal outputs of the lever counter 1200, of the horizontal counter 108, and of several of the other elements shown in FIG. 1A. These elements cooperate to compute when switching is to occur between the two incoming video signals so as to produce rotational special effects in which the angle that the lines of separation make with the horizontal varies linearly with the position of the lever control 101.

The H.L.COUNT and the V.L.COUNT signal outputs of the lever counter 1200 each present a binary number whose magnitude is proportional to the position of the lever control 101. When horizontal, vertical, diagonal, and circular wipe effects are generated, this binary number indicates the desired linear displacement of a non-rotating line of separation. When the rotational special effects are generated, this binary number represents the desired angular displacement of a rotating line of separation. A lever counter binary number output of 2048 corresponds to a line-of-separation rotation of 360 degrees, and a smaller lever counter binary number output corresponds to a proportionally smaller special effect. The maximum lever count may be set at 512 for 90° rotations, at 1,024 for 180° rotations, or at 2,048 for 360° rotations. Control signals generated at 1600 in FIG. 1A (see also FIG. 16) program the lever counter 1200 to generate whatever maximum count is appropriate for each different special effect.

The details of the lever counter 1200 are disclosed in FIG. 12. A detailed description of a similar lever counter is to be found in application serial No. 236,834 cited above (see the discussion which accompaines FIGS. 4A, 4B, and 4C of that application). The lever counter 1200 differs from the lever counter described in application Ser. No. 236,834 only in having one additional control signal input line, one additional lever count output line, and in its use of a complementing gate "TRUE/COMP." to generate a V.LEVER COUNT signal.

The lever counter binary number output represents the desired angle which a line of separation is to make with a horizontal line. The calculators 200 and 300 in FIG. 1B generate pulse trains whose pulse rates represent the cotangent of this desired angle. The summations 400 and 500 accumulate the outputs of the pulse train calculators 200 and 300 and continuously present numeric values equal to the x-coordinate of the desired line of separation to a pair of comparators 600 and 700. The comparators 600 and 700 then compare these desired x-coordinate values to the actual x-coordinate of each image point as indicated by the H.COUNT output of the horizontal counter 108 and signal to a gate 1000 the times when switching between input signals is to take place. In this manner, switching between a first input signal VIDEO A and a second input signal VIDEO B occurs during each horizontal scan at precisely the time when the horizontal scan reaches the desired line of separation. By moving the lever control 101, the angle which this line of separation makes with the horizontal may be increased or decreased.

The cotangent function is used because of the following result which comes from analytic geometry: the x-coordinate of a point on a line of separation equals the product of the Y-coordinate of the point multiplied by the cotangent of the angle which it is desired to have the line of separation make with the horizontal, plus-or-minus an arbitrary constant. The circuitry just described first generates pulses at a frequency that is proportional to the cotangent of the desired angle and then effectively integrates the cotangent function over time by feeding the pulses into a counter. This integral count is equivalent to integrating the cotangent function over the vertically scanned distance (the y-coordinate displacement), since the distance vertically scanned increased linearly with time. Hence, during any given horizontal sweep interval, the result of this integration is proportional to the product of the y-coordinate of the scanning line multiplied by the cotangent of the desired angle. By properly scaling the pulse frequency rate, for example, by using digital scalers in the pulse transmission path or by adjusting the base pulse repetition rate, it is possible to convert this proportionality into an equality. The initial count within the integrating counter at the start of a field scan determines the arbitrary constant mentioned above. A digital comparator then compares the number presented by this integrating counter to the count presented by a horizontal counter which counts during each horizontal scan. An equality between the horizontal count and the integral count would indicate that the horizontal scan is crossing the desired line of separation. This follows because the x-coordinate of the scan at that moment, as represented by the horizontal counter output, equals the sum of the desired arbitrary constant plus the product of the y-coordinate multiplied by the desired cotangent value as represented by the integrating counter output. The digital comparator is programmed to generate a first polarity output signal when the horizontal count is less than the integral count, since this means that the image point being scanned lies on a first side of the desired line of separation. The digital comparator generates a second polarity output signal when the horizontal count is greater than the integral count, since this means that the image point being scanned lies on a second side of the desired line of separation. The comparator output signal may thus be used directly to control the selection of time segments from one or the other of two video input signals for incorporation into a composite video output signal.

The cotangent function is used only because the line-of-separation angles are assumed to be measured with respect to a horizontal reference. If the angles are measured from the vertical, then a tangent function is used. In either case, virtually the same circuitry is used in constructing the invention, since the tangent and cotangent functions are simple reciprocals of each other. It is not intended to limit the scope of the invention to apparatus which utilizes a cotangent function to achieve rotational wipe effects.

The particular summation circuit 400 or 500 comparison output signal which is selected by the gate 1000 and used to control video switching is determined by the angle which the desired line of separation makes with the reference line. More specifically, the comparator 700 output is used for angles in the range of 0°–45°, 135°–225°, and 315°–360°. The comparator 600 output is used for all other angles in the range of 45°–135° and 225°–315°. The gate 1000 simply checks to determine the angle and then passes the proper comparator output signal to the video switch control circuitry.

It is desirable that there be no jitter or instability of a special effect when the gate 100 switches between the two comparators 600 and 700. This switching occurs at angles of 45, 135, 225, and 315 degrees. A smooth transition is achieved by designing the digital circuitry so that identically positioned lines of separation are called for by both of the comparators 600 and 700 at these angular transition points.

Two different approximations to a true cotangent function are computed by the two increment calculators 200 and 300. The increment calculator 300 computes a cotangent function approximation which is acceptably accurate only for lines of separation which make an angle of 45° or less with the horizontal. The increment calculator 200 computes a cotangent function approximation which is acceptably accurate only for lines of separation which make an angle of 45° or more with the horizontal. The gate 1000 monitors the H. L. COUNT signal lines to determine what line-of-separation angle is being called for, and then utilizes the comparator output derived from the increment calculator that is acceptably accurate for that particular angle.

The increment calculator 300 works on the assumption that the cotangent of a small angle is approximately equal to the reciprocal of the angle itself. Briefly described, the calculator 300 comprises a counter which is loaded with the lever count and which then counts up to a fixed count value. The counter is then immediately reset to the lever count and again counts up to the fixed count value. This counting-reset process goes on continuously. Each time the counter resets, it supplies a pulse to a summation counter 500. For a small line-of-separation angle, the resulting pulse repetition rate is proportional to the cotangent of the angle.

The circuitry is adjusted to give a precise result for an angle of 45°.

The increment calculator 200 works on the assumption that the cotangent of a large angle is approximately equal to 90° minus the angle. Briefly described, the calculator 200 comprises a counter which is loaded with the lever count only once during each horizontal scan, and which then counts up to a fixed count value and stops until the next horizontal scan. Each time this counter advances, it supplies a pulse to a summation counter 400 through an appropriately sized scaler or divider. For a large line-of-separation angle, the resulting pulse repetition rate is proportional to the cotangent of the angle. The circuitry is again adjusted to give a precise result for an angle of 45°. While the trigonometric function evaluation approximations which serve as a basis for the operation of the increment calculators 200 and 300 are normally most accurate for small and for large angles, this inherent small and large angle accuracy is sacrificed to obtain precise accuracy for angles close to 45°. This sacrifice effectively prevents any jitter from being introduced into an image when a line of rotation passes through the 45° switch-over point. The inaccuracies which result at smaller and at larger angles are uniform and small, and they have only a negligible effect upon rotational special effects. No visible distortion occurs.

For lines of separation making an angle of less than 45° with the horizontal, a number of horizontal scanning lines at the top of each scan typically pertain to only one image segment and contain no portion of the other image segment. The vertical counter 109 in FIG. 1A counts down from an initial count value at the upper edge of each vertical scan to zero when the scan is halfway or entirely completed. It is convenient to initiate operation of the increment calculator 300 when the vertical counter 109 counts down to the same count value that the lever counter 1200 is presenting. Assuming that the lever counter is properly scaled, this vertical count is reached at approximately the time when the first horizontal scanning line to require switching between one video input and another is generated. For this reason, an output signal from the vertical comparator 112 may be fed into the increment calculator 300 to initiate operation of the calculator precisely at that time. It is then unnecessary to attempt to present the summation 500 to extremely high counts at the start of scans when very small line-of-separation angles are called for.

When rotations about the center of an image area contemplated, the above technique utilizing the vertical comparator 112 may be utilized to center properly the rotation for small angles. For large angles, the lever count is simply used to present the summation counter 400. Both of these techniques adjust the effective initial integrating counter value so as to force the line of separation to pass through the center of the composite image.

Some rotational special effects may combine segments from as many as four incoming video signals into a single composite image. For example, two mutually perpendicular lines of separation may both rotate about the center of an image and may separate four image segments from one another. When a special effect of this type is to be achieved, a quad-split video switch 1100 is used to control the selection of two out of four incoming video input signals for presentation to the signal inputs VIDEO A and VIDEO B of the video switches shown in FIG. 15A. Operation of the quad-split video switch 1100 is controlled first by a lever quadrant detector 800 that indicates which quadrant (0°–90°, 90°–180°, 180°–270°, or 270°–360°) the angle called for by the lever control 101 falls within, and secondly by a picture quadrant detector 900 which indicates which quadrant (upper right, lower right, upper left, or lower left) of the video image is being scanned at any moment in time. The gate 1000 would then be programmed to produce the effect number 6 shown at 1610 in FIG. 13. The resulting effect is four images separated by the four blades of a windmill which may be rotated through 360°.

In addition to the various signal lines shown in FIGS. 1A and 1B, many additional control signals emanate from 1600 in FIG. 1A. These control signals are developed by actuatable push buttons to "program" the circuits shown in FIG. 1A and 1B to produce any desired special effect. With reference to FIG. 13, a system operator may depress any one of the push buttons 1610 and cause control signals to be generated for any one of the special effects illustrated on the push buttons. The push buttons 104, 105, and 106 shown in FIG. 1A and also in FIG. 13 add additional flexibility to the overall system by allowing the direction of rotation for any given wipe to be selected in advance. The use of the push buttons 104, 105, and 106 is optional with the present invention.

III. DETAILED DESCRIPTION OF THE SYSTEM ELEMENTS

A. Increment Calculator 200

FIG. 2 illustrates the details of the increment calculator 200. The calculator 200 is basically constructed from a presetable counter including serially connected counter stages 204 and 206. The counter stages 204 and 206 are loaded with data from the least significant eight binary digits of the horizontal lever counter 1200 output. These least significant eight binary digits flow through a pair of programmable complementing gates 210 and 212 which are controlled by the next more significant horizontal output bit of the lever counter 1200. The counter stages 204 and 206 are arranged to count an eight megacycle signal called the H.CLOCK signal that is derived from the circuitry shown in FIG. 1A and that is synchronized with the horizontal scanning.

The counter stages 204 and 206 together form a counter which may count from any predetermined counting value up to a count of 255. When a count of 256 is reached, the output of the stage 206 clears a J-K flip-flop 208. The Q output of the flip-flop 208 is fed back to a gate 202. The gate 202 blocks any more 8 megacycle H.CLOCK pulses from entering the counter stages. At the end of each horizontal scanning interval, a HORIZ. DRIVE pulse sets the flip-flop 208 and loads the counter stages 204 and 206 with the lever count. The process just described then repeats itself once during each horizontal scanning interval.

At the start of each horizontal scanning interval, the circuitry shown in FIG. 2 begins with the counter stages 204 and 206 loaded with a binary number that corresponds to the eight least significant bits presented by the lever counter, and hence with a number between zero and 255. H.CLOCK pulses then cause the counter stages to count up to a count of 256, after which time the gate 202 is disabled. All pulses which pass through the gate 202 during this interval are applied to a 256-L signal line. This line is so called because it receives a number of pulses during each horizontal scanning interval which equals 256 minus the lever count. This number of pulses is proportional to the cotangent of the angle which the lever count represents, at least for angles between 45° and 135° and between 255° and 315°.

The circuitry shown in FIG. 2 is in operation whenever a line of separation makes an angle of between 45° and 135° or 225° and 315° with the horizontal. These angular ranges correspond to lever counts of 256 to 768 and 1,280 to 1,792. When a horizontal lever count of 256 is generated, the angle which the line of separation forms with the horizontal is 45°, and it is desired to have two pulses per scanning line added into the integrating counter within the summation 400. In binary notation, the number $256_{10}$ is written as $100,000,000_2$. Hence, the horizontal lever count signal lines zero through 7 all present 0 data bits to the complementing gates 210 and 212, and the signal line 8 presents a 1 data bit to these gates. This 1 data bit causes the gates 210 and 212 to pass the signals zero through 7 unaltered to the present inputs of the counter stages 204 and 206 so that the binary number zero is loaded into the counter stages 204 and 206. During each horizontal scanning interval, the counter stages 204 and 206 are then permitted to count from zero to 256 before counting is terminated. As a result, 256 pulses pass through the gate 202 and are applied to the 256-L signal line. The pulses from this signal line are passed through a divide-by-128 scaler comprising the stages 402 and 404 in FIG. 4, and ultimately two pulses per scanning line are fed into the integrating counter comprising the stages 406 and 408 in FIG. 4.

As the lever count is increased beyond 256, a number greater than zero but less than 256 is presented to the counter stages 204 and 206. In response, the counter stages 204 and 206 allow progressively fewer pulses to pass through the gate 202 to the 256-L signal line during each horizontal scanning interval, and fewer pulses per line are fed into the integrating counter within the summation 400.

A lever count of 512 corresponds to a line of separation which is vertical. When a count of 512 is reached, the lever count signals presented to the complement gates 210 and 212 are all zero data bits. Hence, the eighth signal line goes to ground potential and causes the complement gates 210 and 212 to reverse the sign of all the less significant data bit lines zero through 7. Hence, all 1 data bits are presented to the preset inputs of the counter stages 204 and 206 for a count of 512 just as was the case for a count of 511. If the lever control 101 is advanced further, the lever counter advances beyond 512 and the number presented to the inputs of the complement gates 210 and 212 increases from zero upwards. Since the signal line 8 still presents a 0 data bit to the complement gates 219 and 212, the complement of these small numbers is generated and is equivalent to the difference between the small number and 256. This difference is loaded into the counter stages 204 and 206 and thus causes progressively more counts to be supplied by the counter stages during each horizontal scanning interval as the lever count is advanced beyond 512.

Just prior to when the line of separation reaches an angle of 135°, the lever counter presents the binary number 767 to the input of the complement gates 210 and 212 and still presents a 1 data bit to the control inputs of the complement gates 210 and 212. The gates 210 and 212, therefore, load the binary number zero into the counter stages 204 and 206. When an angle of 135° is reached, the lever count reaches 768. In binary form $768_{10}$ is written as $1,100,000,000_2$. Hence, an all-zero input is presented to the terminal zero to 7 of the complement gates 210 and 212 and a 1 data bit is presented over the eighth signal line to the control inputs of the complement gates 210 and 212. The gates 210 and 212 thus pass the number zero into the counting stages 204 and 206 and again cause the binary number zero to be loaded into the counter stages 204 and 206. In this manner, a pulse frequency is developed which varies as the difference between 90° and the desired line-of-separation angle for any angle within the range of 45° to 135°. This pulse frequency is approximately equal to the cotangent of such angles.

For line-of-separation angles between 225° and 315°, the horizontal lever count signals presented by the lever counter to the complement gates 210 and 212 are exactly the same as the count signals that are presented for line-of-separation angles between 45° and 135°. Hence, the increment calculator 200 functions in exactly the same manner for angles of between 225° to 315° as it does for angles of between 45° to 135°.

To aid in the centering of rotational special effects, the outputs of the complement gates 210 and 212 are fed into FIG. 4 in the form of a 45°–90° CENT (centering) signal which is used to prime the integrating counter within the summation 400.

B. 0 TO 45 DEGREE INCREMENT CALCULATOR

The 0° to 45° increment calculator 300 appears in FIG. 3. The calculator 300 comprises basically the two counting stages 302 and 304. An 8-megacycle input pulse signal is fed continuously into either the UP or the DOWN input of the stage 302 through one or the other of the gates 308 and 310. The stages 302 and 304 count either up to 255 or down to zero and then generate either an overflow or an underflow output pulse. This output pulse normally flows through a gate 306 and loads the two counter stages from the eight least significant signal lines of the horizontal lever count output signal. The same pulse which loads the counter stages also flows to the summation 500 over a 512/L signal line.

The direction in which the counter stages count is controlled by the horizontal lever count 8th output signal line. This 8th signal line causes the count to progress down from the lever count for angles of 0°–45° and 180°–255° and causes the count to progress up from the lever count for angles of 135°–180° and 315°–360°. The count direction is reversed in this manner for basically the same reason that the lever count is complemented by the gates 210 and 212 in FIG. 2 - to insure that the cotangent function has the proper relationship to the line-of-separation angle in all quadrants.

For an angle of zero degrees, the counter stages 302 and 304 are initially loaded with zero and then attempt to count down from zero. A continuous stream of 8-megacycle pulses flows over the line 512/L and results in a horizontal line of separation. For angles of increasing size, the frequency of pulses generated drops in inverse proportion to the angle because progressively larger initial count values are loaded into the counter stages. For an angle of 45°, a lever count of 256 is loaded into the counter stages each time they are reset.

With 512 incoming pulses per horizontal scanning interval, two pulses are applied to the line 512/L during each such interval. The number of pulses applied to the 512/L signal line during each horizontal scanning interval is thus 512 divided by the lever count for non-zero lever count values. This frequency of pulses is approximately proportional to the cotangent of the angle which the lever count represents.

For other angles of interest, the calculator 300 functions in a similar manner. The counting direction is reversed for angles in the range of 135°–180° and 315°–360°, since the cotangent of such angles is equal to the cotangent of 180° or 360° minus those angles. This subtraction is carried out by reversing the direction of count and ignoring the more significant lever counter digits, as is apparent in FIG. 3.

For some special effects, the calculator 300 is disabled until the vertical count equals the lever count. The two gates 308 and 310 are disabled by a bistable 312, the signal output of which flows through a gate 318. The bistable 312 comprises a pair of cross-connected gates 314 and 316. At the start of each vertical scan, a vertical drive pulse sets the bistable 312 and blocks the gates 308 and 310 directly. After the scan begins, the bistable keeps on blocking the gates 308 and 310 until a V.COMP (vertical compare) pulse is generated by the vertical comparator 112 (FIG. 1A) indicating that the vertical scan count of the vertical counter 109 equals the lever count. The bistable 312 is cleared by this pulse and then permits the increment calculator 300 to begin functioning. A control signal DD allows the bistable 312 to be disabled so that the increment calculator 300 begins functioning when the vertical drive pulse terminates. A capacitor 320 connects the V.COMP signal line to ground.

C. 45 TO 90 DEGREE SUMMATION

The summation circuit 400 includes an integrating counter which sums the pulses that flow from the increment calculator 200. The 256-L signal pulses from the calculator 200 are first fed through a divide-by-128 scaler that is constructed from a pair of counters 402 and 404. This scaler is programmed to supply one output pulse for every 128 input pulses that it receives. The scaler output pulses are then counted by a pair of counting stages 406 and 408 and a flip-flop 410 which together comprise the integrating counter for the summation 400. The flip-flop 410 is a simple one-bit extra stage for the integrating counter.

At the beginning of each vertical scan, a vertical drive pulse resets the summation 400. The counting stages are either cleared to zero count or are preset to the lever count in accordance with whether or not a DD control signal is present. The lever count is presented to the counter stages through a gate 412 in the form of a 45°–90° CENT. signal which comes from FIG. 2. The two gates 416 and 418 are programmed by the DD control signal to channel the vertical drive pulse to either the clear C or the load L terminals of the counter stages 406 and 408, whichever is appropriate.

It is sometimes desirable to invert or complement the output of the integrating counter before feeding it to the comparator logic. A T signal is generated in FIG. 10 to execute this function. The T signal is not a control signal which is created by push-button programming. It is a dynamic signal, as is explained in connection with FIG. 10.

D. ZERO TO 45 DEGREE SUMMATION

The zero-to-45-degree summation 500 is simply an integrating counter which continuously counts the pulses presented by the 512/L signal line. The direction of count is determined by the same T signal that complements the output of the summation 400. This T signal channels the 512/L pulses through one or the other of the gates 518 or 520 to either the counting stage up or down input terminal in accordance with its polarity. When a count of zero or of 510 is reached, a bistable 508 stops the summation 500 from functioning by blocking both of the gates 518 and 520. The summation logic is reset by a vertical drive pulse at the end of each vertical scan to an initial count of zero or 511, depending upon the state of the T signal that is fed to the "preset" inputs of selected counter stages. The vertical drive pulse clears a pair of flip-flops 514 and 516 which reset the bistable 508 and thus enable the two input gates 518 and 520 to receive the 512/L pulses once again. The first two such pulses sequentially clear the flip-flops 516 and 514 in that order, so that the flip-flop 514 is able to lock the bistable 508 in a cleared state until the counter stages count away from their initial count values. The bistable 508 comprises a pair of cross-connected logic gates 510 and 512.

E. COMPARATORS

The comparators 600 and 700 are respectively shown in FIGS. 6 and 7 and are essentially identical to one another. The comparator 600 comprises two comparator stages 602 and 604 connected in tandem with one another to generate an output signal that indicates which of the two binary number inputs to the comparator is the larger. The comparator 700 is similar in function and includes the two comparator stages 702 and 704.

F. QUADRANT DETECTOR CIRCUITS

The two quadrant detector circuits 800 and 900 are similar and are shown in FIGS. 8 and 9. The lever quadrant detector 800 is used to determine which of four possible quadrants a line-of-separation angle falls into in accordance with the lever count. The two most significant output digits generated by the lever counter 1200 (FIG. 1A) are fed into the lever quadrant detector 800, and a signal for each possible quadrant flows from the detector 800. For lines-of-separation angles between zero and 90 degrees, the count presented by the lever counter is between zero and 511 and the two most significant signal lines emanating from the lever counter present 0 data bits to the logic shown in FIG. 8. In response, a gate 810 generates an L.QUAD-1 (lever quadrant number 1) signal to indicate the quadrant (or 90°-sector) of the line of separation. In a similar manner, a gate 812 signals when the line of separation forms an angle of between 90° and 180° with the horizontal; a gate 814 signals when the line of separation forms an angle of between 180° and 270° with the horizontal; and a gate 816 signals when the line of separation forms an angle of between 270° and 360° with the horizontal.

An exclusive OR gate 808 in FIG. 8 examines the eighth and ninth signal lines emanating from the lever counter and determines whether the output of the comparator 600 or of the comparator 700 is to be selected by the gate 1000 and passed on to the video switching circuitry.

The picture quadrant detector 900 is similar to the lever quadrant detector and determines in which of the four quadrants the video scan is being carried out. The horizontal and vertical counters 108 and 109 (FIG. 1A) generate respectively an H.UP and V.UP signal to indicate whether the horizontal and vertical counters are counting down to zero or up from zero. In their normal modes of operation, the counters 108 and 109 start out at an initial preset count and count down to zero count, reaching zero count when the corresponding scan is halfway completed. The counters then reverse their counting direction and count up for the remainder of the scan. The H.UP and V.UP signals, therefore, may be used to signal when a scan has passed the midpoint of an image. Logic gates 902, 904, 906, and 908 respond to the four possible states of the H.UP and the V.UP signals and generate the signals P.QUAD. 1, P.QUAD. 2, . . . , and P.QUAD 4 (picture quadrant signals) to indicate which quadrant (upper left, upper right, etc.) is being scanned at any given moment.

G. GATE

The gate 1000 determines precisely what signal is going to control the video switching. Most fundamentally, insofar as rotational wipe effects are concerned, the gate 1000 selects one or the other of the comparator output signals and channels that signal to the video switches over a ROTEC COMPARE signal line. For simple corner wipes, such as the wipe 3 illustrated at 1610 in FIG. 13, this is all that the gate does. Most wipes, however, include horizontal and vertical lines of separation which are generated by the gate 1000. Some wipes, such as the wipe 1 at 1610 in FIG. 13, require the gate 1000 to take different action in different quadrants of the video scan. The gate 1000 includes logic elements which take the scan quadrant into account.

The gate 1000 is programmed by a number of static control signals generated by the push-button switches in FIG. 16. Depression of any of the six push buttons 1610 programs the gate 1000 and other elements of the generator to produce the effects illustrated in FIG. 13.

For the simplest of rotational special effects, a control signal VV enables one or the other of the comparator output signals 0°–45° COMP. or 45°–90° COMP. to flow through one of the gates 1002 and 1004 and then through the gates 1006, 1008, 1010, 1012, 1014, 1016, 1018, and 1020 to the ROTEC COMPARE signal line. The particular comparator signal selected is determined by the 256/512 signal which enables one of the gates 1002 or 1004 and disables the other in accordance with the angle called for by the lever counter, as has been explained. In order to keep the image segments from reversing their locations when the 90°- and 180° points in a rotation are passed, the ninth and tenth lever count signal lines program exclusive-OR gates 1008 and 1010 to reverse the sign of the ROTEC COMPARE signal at these angular points.

To achieve a wipe such as wipe 2 at 1610 in FIG. 13, it is necessary to reverse the sign of a ROTEC COMPARE signal halfway through a scan. In FIG. 10, a control signal BB allows the 256 count output of the horizontal counter to pass through a gate 1046 and program an exclusive-OR gate 1016 to reverse the ROTEC COMPARE signal halfway through each horizontal scan. The resulting wipe typically would be like wipe 2 at 1610 in FIG. 13 but rotated 90° from the wipe shown.

The T signal, which reprograms the summations 400 and 500, is the 9th lever counter output which reverses every 90° of rotation. For wipes and effects of over 90°, the T signal prevents reversal of the wipe when a line of separation becomes horizontal or vertical. For "maltese" special effects such as the 90° wipe 4 at 1610 in FIG. 13, a control signal AA allows the V.UP. (vertical counter up) signal to flow over the T line and cause the mirror-image of a line of separation to be generated as in the wipe 4. A control signal JJ forces the ROTEC COMPARE signal into a first state only when the 0°–45° COMP. signal is high and the 45°–90° COMP. signal is low, and forces the ROTEC COMPARE signal into a second state for all other conditions of comparator signals. The control signals JJ and AA together produce a double-maltese effect including four lines of separation that rotate about the center of the image and produce a complete wipe with only a 45° advance of the lever counter. A gate 1022 is disabled at the start of each horizontal scan, but is enabled by the 0°–45° COMP. signal when a first less-than-45° line of separation is reached. The gate 1022 remains enabled until it is disabled by the onset of the 45°–90° COMP. signal when a second more-than-45° line of separation is reached. All of this occurs during the first half of the horizontal scan. The process just described is repeated in reverse order during the second half of the scan. This double-maltese wipe effect divides the composite image into eight pie-shaped segments alternate ones of which expand and contract together as the lever control is actuated.

The linear 4-way wipe 6 shown at 1610 in FIG. 13 requires a shift from one comparator output to the other in alternate quadrants. This wipe is initiated by the control signal HH in FIG. 10. When the control signal HH is present, the comparator output signals flow through the gates 1034 or 1032, 1036, 1026, 1038, 1014, 1016, 1018, and 1020 to the ROTEC COMPARE signal line. The choice of comparator signal is determined by the output of a gate 1028 which enables one of the gates 1032 or 1034 and disables the other. The H.UP and V.UP signals generated by the horizontal and vertical counters 108 and 109 at midscan are combined by an exclusive-OR gate 1030 and are fed into the gate 1028 to select the proper comparator signal. Wipe 6 at 1610 in FIG. 13 reveals that a first comparator output is required in the upper left and lower right quadrants when the H.UP and V.UP. signals are both low or both high, and a second comparator output is required in the upper right and lower left quadrants when the H.UP and V.UP signals are opposite in sign from one another. The gate 1030 determines whether the H.UP and V.UP signals are of the same or opposite signs and selects a comparator signal accordingly. Since the comparator quadrant assignments must be reversed for lever counter angles above 45°, the 8th signal line from the lever counter programs the exclusive-OR gate 1028 to reverse the comparator signal selection in each quadrant for angles greater than 45°. To prevent the image segments from trading places when this wipe passes the 45° mark, the 8th signal line from the lever counter also programs an exclusive-OR gate 1026 to reverse the sign of the ROTEC COMPARE signal when the 45° rotation point is passed.

A fan wipe 5 is illustrated at 1610 in FIG. 13. This wipe is achieved when control signals LL and AA are both present. This wipe uses the ROTEC COMPARE signal generated for the simple maltese wipe and passes this signal through gates 1054, 1056, and 1040 rather than through the gate 1012. A one-shot multivibrator 1052 is initialized by a V.DRIVe pulse at the start of each vertical scan and times out at the midpoint of each vertical scan. The ninth signal lead from the lever counter is used to signal when the wipe progresses beyond 90°. For wipe angles from 0° to 90°, the comparison signals pass unimpeded through the gates 1054 and 1056 during the first half of each vertical scan and are then blocked by the gate 1056 during the second half of the scan. The bottom half of the maltese wipe (wipe 4 at 1610 in FIG. 3) is thus cut off to give the fan wipe 5 down to 90°. The gate 1056 is disabled during the second half of the scan by a high level output from the one-shot 1052 which is inverted by the gate 1058 and is applied as a ground level input to the gate 1056.

During the second 90° of the fan wipe, the 9th output signal of the lever counter goes high, disables the gate 1058 and simultaneously enables the gate 1060. Now the comparator output signal is permitted to pass through the gates 1054 and 1056 only during the second half of each vertical scanning interval and is blocked by the gate 1054 during the first half of each scanning interval. The gate 1054 is disabled furing the first half of each interval by a low-level output of the one-shot 1052 and the inverted high-level 9th lever counter signal which together force the NOR gate 1060 to disable the gate 1054. The top half of a maltese wipe is now cut off, and the fan wipe extends only from the center of the image to its bottom.

The achievement of the clock wipe 1 at 1610 in FIG. 13 requires information both as to the picture quadrant being scanned (upper left, upper right, lower left, or lower right) and as to the quadrant within which the desired line of separation falls (0°–90°, 90°–180°, 180°–270°, or 270°–360° quadrant). A control signal CC, together with the control signal VV, brings a comparator 1042 into play which collects the above information, determines what segment or segments belong in each quadrant, and actuates the NOR gates 1018 and 1020 so as to either pass the 0°–45° or 45°–90° comparator signals to the ROTEC COMPARE signal line or block the signals and clamp the ROTEC COMPARE signal line in either of its states. The comparator 1042 assumes that the quadrants are assigned binary numbers as follows:

| QUADRANT | LOCATION | ANGLE | BINARY CODE |
|---|---|---|---|
| 1st quadrant | upper right | 0–90 | 00 |
| 2nd quadrant | lower right | 90–180 | 01 |
| 3rd quadrant | lower left | 180–270 | 10 |
| 4th quadrant | upper left | 270–360 | 11 |

The 9th and 10th lever count signal lines indicate directly the desired angle quadrant using this code and are fed into the B comparator inputs. The 256 output of the horizontal counter indicates the least significant digit of the scan location quadrant in accordance with this code and is fed into the upper A input of the comparator. The V.UP signal does indicate whether the scan is in the upper or lower half of an image but it is not in accordance with the most significant digit of the above code. Accordingly, it is passed through an exclusive-OR gate 1044 to the remaining A comparator input. The 256 output signal is inverted and is applied to an input of the exclusive-OR gate 1044 so as to reverse the sign of the V.UP signal in dependence upon the state of the 256 horizontal counter output signal. The binary number applied to the A comparator input is then in accord with the above code and indicates the quadrant that is being scanned.

The comparator 1042 then simply compares its A and B inputs. If they are equal, then the quadrant being scanned is the one in which the line of separation is to fall, so the comparator 1042 enables both of the gates 1018 and 1020 to pass the ROTEC COMPARE signal directly from the 0°–45° COMP. and the 45°–90° COMP. signal sources. If the A input is smaller, then the quadrant being scanned rotationally precedes the quadrant in which the line of separation is to fall, so the comparator 1042 uses the gate 1020 to lock the ROTEC COMPARE signal in a first state. If the A input is larger, then the quadrant being scanned rotationally follows the quadrant in which the line of separation is to fall, so the comparator 1042 uses the gate 1018 to lock the ROTEC COMPARE signal in a state opposite to the first state. In this manner, the wipe at 1610 in FIG. 13 is achieved. (Note: the push-button 1610 labelled 1 illustrates the clock wipe with its starting position 90° counterclockwise from its vertical starting position in the preferred embodiment of the invention.)

H. QUAD-SPLIT VIDEO SWITCH

The detalis of the quad-split video switch 1100 are shown in FIG. 11. The purpose of the switch 1100 is to select two of four video signals for presentation to the electronic switch that is controlled by the gate 1000 for achievement of special effects in which four different video signals participate. The switch 1100 includes a conventional electronic video cross-point array which includes electronic switches 1102, 1104, 1106, 1108, 1110, 1112, 1114, and 1116 which may be electronically actuated to connect any one of four incoming video signals to either of the two outgoing video lines. The electronic video switches are actuated by the output of logic gates 1118, 1120, 1122, 1124, 1126, 1128, 1130, and 1132. These gates in turn are selectively enabled by various combinations of output signals generated by the gates 1134, 1136, 1138, 1140, 1142, 1144, 1146, and 1148. In their turn, these gates are selectively actuated by the gates 1150, 1152, 1154, 1156, . . . , and 1180 each of which accepts as input signals one picture quad signal and one lever quad signal.

The quad-split video switch 1100 simply causes the proper pair of the four incoming video signals to be selected and supplied to the video A and video B input signals of the electronic switch shown in FIG. 15 in accordance with the picture quadrant being scanned and the rotation angular quadrant that is specified by the lever counter. Assuming that the special effects generator is programmed to generate a windmill wipe 6 shown at 1610 in FIG. 13, the additional use of the quad-split video switch produces a rotational effect (not a wipe) in which four image segments from four different video sources are separated from one another by perpendicular lines of separation which intersect at the center of the image and which may be freely rotated through 360°.

Assume, for example, that the signal P.QUAD. 1 (picture quadrant 1) and the signal L. QUAD. 1 (lever quadrand 1) are both simultaneously present. With reference to FIGS. 8 and 9, these signals are at ground level when they are present and at a high level when they are absent. The signal P.QUAD. 1 causes the gates 1150, 1154, 1158, and 1162 to genernate high level output signals. The signal L.QUAD. 1 causes the gates 1150, 1152, 1166, and 1168 to generate high level output signals. Since the gates 1134 through 1148 are all NAND gates, it takes two high level input signals to any one of those gates to produce a low level output signal at the gate output. The only one of the gates 1134–1148 which now receives two high level input signals is the gate 1138. Hence, the gate 1138 generates a low level output signal which is inverted by the gates 1120 and 1122 and which actuates the electronic switches 1104 and 1110. Hence, the VIDEO 1 input signal is channeled to the VIDEO B input of the electronic switch in FIG. 15A and the VIDEO 2 signal is channelled to the VIDEO A input of the electronic switch in FIG. 15A. In a similar manner, any other combination of picture and lever quadrant signals causes a particular pair of the electronic switches 1102–1116 to be actuated. The particular arrangement of logic gates selected is simply that required to give the desired video signal selection for each combination of picture and lever quadrant possibilities. Once it is known what video switching is required in each picture quadrant (upper left, upper right, etc.) for each possible rotational angle quadrant (0°–90°, 90°–180°, etc.), then it is a straightforward task to assemble an appropriate quad-split video switch logic network to give the desired result.

While FIG. 11 illustrates a particular interconnection which is required to achieve a particular special effect, it is to be understood that the interconnection configuration may be varied to allow the achievement of other effects using multiple video signals and also to compensate for the particular nature of the gate 1000 or its equivalent.

I. MODIFICATIONS TO THE LEVER COUNTER

The lever counter 1200 is illustrated in FIG. 12. It is a slightly modified version of a lever counter that is described fully in the Hudson patent cited above. It has been modified first to count all the way up to 2048, and in this connection an extra 10th output lead has been added to the presettable up/down counter and to the latch. It has also been modified by the addition of a 2048 control signal input which enables a count from 0 to 2048 to be achieved when the lever control is advanced from one extreme position to the other.

For the achievement of certain rotational special effects, it is necessary to modify the lever count number that is fed into the vertical comparator 112. For this reason, the output of the lever counter latch is channelled through a TRUE/COMP. gate. This gate is controlled by the 8th lever count output signal to reverse or complement the count presented to the vertical comparator 112 for lever angles of 45°–90°, 135°–180°, 225°–270°, and 315°–360°. The complementing action of this gate is defeated by the absence of a control signal FF when non-rotational wipes are generated. For signal identification purposes, the non-complemented output of the lever counter latch is called the H.LEVER COUNT (horizontal lever count) signal, since it is fed into the horizontal comparator 111 through the diagonal adder 113. The complemented output of the lever counter latch is called the V.LEVER COUNT (vertical lever count) signal, since it is fed into the vertical comparator 112.

J. OUTPUT SWITCH 1400

The output switch 1400 is described in complete detail in the Hudson patent cited above. The only modification required for the achievement of rotational special effects is the addition of a gate 1402 which combines the ROTEC COMPARE signal generated by the gate 1000 with the C.COMP (circle compare) signal. The output of the output switch 1400 is fed into any type of conventional two-signal-input video switching circuit and, in particular, may be fed into the video switching circuit illustrated in FIG. 15. A detailed description of the switching circuit illustrated in FIG. 15 may be found in patent application Ser. No. 131,300 which was filed in Apr. 5, 1971, now U.S. Pat. No. 3,812,286 which issued on May 21, 1974 to Nikola B. Tkacenko.

L. CONTROL SIGNALS

The achievement of any particular special effect is achieved by depressing the corresponding push button shown at 1610 in FIG. 13. With reference to FIG. 16, actuation of any one push-button switch causes an array of one or more diodes to ground one or more of the control signal lines whose names are listed along the right-hand edge of FIG. 16. The functions of most of these control signals are explained in the earlier filed Hudson patent which was cited above. The functions of all the control signals beginning with the control signal 2048 and continuing on to the bottom of FIG. 16 are explained in the present application at earlier points in this discussion. The diode arrays shown produce the special effects illustrated on the push-buttons 1610 in FIG. 13. It is to be understood that many more interesting special effects may be achieved by adding additional push buttons and diode arrays to FIG. 16.

While the preferred embodiment of the present invention has been described, it is to be understood that numerous modifications and changes will occur to those who are skilled in the art. It is therefore intended by the appended claims to cover all such modifications and changes as fall within the true spirit and scope of the invention.

What is claims as new and desired to be secured by Letters Patent of the U.S. is:

1. A digital rotational special effects generator having at least two video inputs and at least one video output, said generator comprising:
   means for generating a first number proportional to the x-coordinate of each image point in each horizontal scan;
   means for generating a second number proportional to the product of the y-coordinate of each image point multiplied by a third number that represents the desired amount of effect rotation;
   means for comparing said first and second numbers and for generating a signal whose state indicates which of said numbers is the larger number; and
   video switching means controlled by said comparing means signal for disconnecting said video output from one of said video inputs and for connecting said video output to another of said video inputs each time said comparison means signal changes its state.

2. A generator in accordance with claim 1 to which is added means for altering the coordinate frame used by said means for generating said first and second numbers whereby both centered and non-centered rotational effects may be achieved with said generator.

3. A generator in accordance with claim 1 wherein said means for generating a number proportional to the x-coordinate of each image point comprises a counter programmed to reverse its direction of count at least once during each horizontal scanning interval, whereby rotational effects having mirror-image symmetry, such as fan and maltese effects, may be achieved.

4. A generator in accordance with claim 1 which further includes means for signalling the desired quadrant of a composite image in which a line of separation is to lie, means for signalling the image quadrant that is being scanned at any moment, and means responsive to a quadrant being scanned other than that in which a line of separation is to lie for overriding said comparing means signal and for forcing said video output to a predetermined one of said video inputs in accordance with the nature of the effect, whereby hour-hand and other similar wipe effects may be achieved.

5. A generator in accordance with claim 1 and further including means for sensing times when a scan is half-way completed and for signalling to said video switching means at such times, and wherein said video switching means includes means for responding to such signals from said sensing means by disconnecting said video output from one of said video inputs and by connecting said video output to another of said video inputs, whereby a stationary line of separation may be combined with a rotatable line of separation to produce a propeller wipe effect.

6. A generator in accordance with claim 1 which includes means for generating a fourth number proportional to the product of the y-coordinate of each image point multiplied by a fifth number that represents a second desired amount of effect rotation, and means responsive to the scan position for causing said comparison means to compare said first number to said fourth number during the scanning of selected image segments, whereby effects may be achieved containing two lines of separation each having a different slope.

7. A generator in accordance with claim 6 wherein means are provided for causing said third number to be the approximate reciprocal of said second number, whereby double maltese and propeller wipe effects may be achieved.

8. A generator in accordance with claim 6 wherein means are provided for signalling each quadrant of the video scan and for causing the selection of a particular one of said second and fourth numbers in each quadrant, whereby propeller and other similar wipe effects may be achieved.

9. A generator in accordance with claim 6 wherein means are provided for signalling the octant of the video scan and for causing the selection of a particular one of said second and fourth numbers in each octant, whereby double maltese wipe effects and the like may be achieved.

10. A digital rotational special effects generator having at least two video inputs and at least one video output, said generator comprising:
 means for generating a first number proportional to the x-coordinate of each image point in each horizontal scan;
 means for generating a second number proportional to the product of the y-coodinate of each image point multiplied by the approximate tangent or cotangent of the desired angle of effect rotation;
 means for comparing said first and second numbers and for generating a signal whose state indicates which of said numbers is larger; and
 video switching means controlled by said comparing means signal for disconnecting said video output from one of said video inputs and for connecting said video output to another of said video inputs each time said comparison means signal changes in state.

11. A generator in accordance with claim 10 to which is added means for altering the coodinate frame used by said means for generating said first and second numbers, whereby both centered and non-centered rotational effects may be achieved.

12. A generator in accordance with claim 10 wherein said means for generating a number proportional to the x-coordinate of each image point comprises a counter programmed to reverse its direction of count at least once during each horizontal scanning interval, whereby rotational effects having mirror-image symmetry, such as fan and maltese effects, may be achieved.

13. A generator in accordance with claim 10 which further includes means for signalling the desired quadrant of a composite image in which a line of separation is to lie, means for signalling the image quadrant that is being scanned at any moment, and means responsive to a quadrant being scanned other than that in which a line of separation is to lie for overriding said comparing means signal for forcing said video switching means to connect said video output to a predetermined one of said video inputs in accordance with the nature of the effect, whereby hour-hand and other similar wipe effects may be achieved.

14. A generator in accordance with claim 10, further including means for sensing times when a scan is half-way completed and for signalling to said video switching means at such times, and wherein said switching means includes means for responding to such signals from said sensing means by disconnecting said video output from one of said video inputs and by connecting said video output to another of said video inputs, whereby a stationary line of separation may be combined with a rotatable line of separation to produce a propeller wipe effect.

15. A rotational special effects generator in accordance with claim 14 wherein said pulse generating means includes:
 a first counter that, for a fixed amount of time during each horizontal scan interval, counts from an initial count of L or the complement of L to a final reference count level, generating one output pulse each time this counting procedure is repeated;
 a second counter that counts from an initial count L or the complement of L to a final reference count level a fixed number of times during each horizontal scanning interval, and means associated with the second counter for generating an output pulse once for every N counts of the second counter, where N is an interger; and
 selection means for selecting the output pulses of either said first or said second counter in accordance with the magnitude of L so as to obtain an output pulse rate approximately proportional to the tangent of the desired angle of rotation.

16. A generator in accordance with claim 10 which includes means for generating a fourth number proportional to the product of the y-coordinate of each image point multiplied by the approximate tangent or cotangent of a second desired angle of effect rotation, and means responsive to the scan position for causing said comparison means to compare said first number to said fourth number during the scanning of selected image segments, whereby effects may be achieved containing several lines of separation each having a different slope.

17. A generator in accordance with claim 16 wherin means are provided for causing said fourth number to be the approximate reciprocal of said second number, whereby double maltese and propeller wiper effects may be achieved.

18. A generator in accordance with claim 16 wherein means are provided for signalling each quadrant of the video scan and for causing the selection of a particular one of said second or fourth numbers in each quadrant, whereby propeller wipe effects may be achieved.

19. A generator in accordance with claim 16 wherein means are provided for signalling the octant of the video scan and for causing the selection of a particular one of said second and fourth numbers in each octant, whereby double maltese wipe effects and the like may be achieved.

20. A digital rotational special effects generator having at least two video inputs and at least one video output and comprising:
   means for generating a number proportional to the desired angle of effect rotation;
   incremental calculation means including at least one counter for using said number to control the generation of pulses at a rate which varies approximately in proportion to the tangent or cotangent of said angle of rotation;
   summation means including a counter for counting and summing the number of said pulses generated during each vertical scanning interval;
   horizontal counter means for generating a number proportional to the horizontal position of a video scan;
   comparison means connecting to said summation means and to said horizontal counter means for comparing the number of pulses counted by said summation means to the number generated by said horizontal counter means and for generating an output signal whose state indicates whether or not the number of pulses counted by said summation means exceeds the number generated by said horizontal counter means; and
   video switching means controlled by the output signal of said comparison means for disconnecting the video output from one video input and for re-connecting the video output to another video input when said comparison means output signal changes its state.

21. A rotational special effects generator having a video output and at least two video inputs comprising:
   means for generating a number L that is proportional to a desired angle of rotation;
   means for computing a number M equal to the tangent or cotangent of the number L multiplied by the instantaneous y-coordinate of the video signal scan position plus or minus an arbitrary constant which may be zero;
   means for comparing said number M to the instantaneous x-coordinate of the video signal scan position and for generating a bindary signal whose state indicates the result of the comparison; and
   video switching means for disconnecting said video output from one of said video inputs and for connecting said video output to another of said video inputs when said binary signal changes its state.

22. A digital rotational special effects generator having at least three video inputs and at least one generator video output, said generator comprising:
   means for generating a first signal which changes its state at least once during each horizontal scan;
   means for generating a second signal which changes its state at least once during each vertical scan;
   first video switching means having a pair of video outputs and connecting to said first and second signals and to said video inputs for connecting said pair of outputs to particular ones of said video inputs in response to each of the possible states of said first and second signals, whereby said first and second signals cause differing pairs of said video inputs to be selected by said video switching means during the scanning of differing portions of a video image;
   means for generating a first number proportional to the X-coordinate of each image point in each horizontal scan plus-or-minus an arbitrary constant which may be zero;
   means for generating a second number proportional to the product of the Y-coordinate of each image point plus-or-minus an arbitrary constant which may be zero multiplied by a third number representing a desired amount of effect rotation;
   means for comparing said first and second numbers and for generating a third signal whose state indicates which of said numbers is the larger number; and
   video switching means controlled by said third signal for disconnecting the generator video output from one of said switching means video outputs and for connecting the generator video output to the other of said switching means video outputs each time said third signal changes its state;
   whereby rotational special effects involving three or more video signals may be generated.

23. A digital rotational special effects generator having at least four video inputs and at least one generator video output comprising:
   means for generating a first digital signal representation of a first number representing the desired angle of effect rotation;
   means for generating second and third digital signal representations of second and third numbers respectively proportional to the approximate tangent and cotangent of said first number;
   means for generating scan quadrant signals indicative of the quadrant that is being scanned at any given moment;
   means controlled by said quadrant signals for generating a fourth digital signal representation of a fourth number that is proportional to the product of the Y-coordinate of the video scanning multiplied by said second number in a first and third quadrant and by said fourth number in a second and fourth quadrant, where the quadrants are numbered in a clockwise or counterclockwise direction;
   means for generating a fifth digital signal representation of a fifth number that is proportional to the X-coordinate of the video scanning;

comparison means for comparing said forth and said fifth numbers and including means for generating a comparison signal indicative of the result of said comparison;

means for deriving from said first digital signal representation a rotation quadrant signals that are indicative of the quadrant within which a rotational line of separation is to lie;

first video switching means connecting to said four video inputs and having a pair of video outputs for connecting particular inputs to each of said pair of outputs in response to each possible combination of said scan quadrant and rotation quadrant signals; and second video switching means for disconnecting said generator video output from one of said pair of video switching means video outputs and for reconnecting said generator video output to the other of said pair of video switching means video outputs in response to a change in the state of said comparison signal;

whereby quad-split rotational special effects may be achieved in which, for example, image segments from four different sources may be rotated about one another in windmill fashion.

24. A video special effects generator for generating an output video waveform different image segments of which are derived from a plurality of different video input signals which have synchronized horizontal and vertical scanning periods, said segments intersecting along at least a first rotatable predetermined boundary, said generator comprising means for generating a first reference digital representation, means for generating a series of second digital representations corresponding to different time segments in a horizontal scanning period, means for generating a series of third digital representations corresponding to different time segments in a vertical scanning period, and means controlled by said first, second, and third digital representations for switching said video output between said video input signals at times such that said rotatable predetermined boundary is established.

25. A video special effects generator for generating an output video waveform different image segments of which are derived from a plurality of different video input signals which have synchronized horizontal and vertical scanning periods, said segments intersecting along at least a first rotatable predetermined boundary, said generator comprising means for generating a first reference digital representation, means for generating a series of second digital representations corresponding to different time segments in a horizontal scanning period, means for generating a series of third digital representations corresponding to different time segments in a vertical scanning period under the control of said first digital representation such that the ratio of the numeric spacing between at least some successive representations in said series to the time durations of the corresponding time segments is determined by reference to the digital magnitude of said first reference digital representation, and means controlled by said second and third digital representations for disconnecting said video output from one of said video inputs and for connecting said video output to another of said video inputs at times such that said rotatable predetermined boundary is established.

26. A video special effects generator for generating an output video waveform different image segments of which are derived from a plurality of different video input signals which have synchronized horizontal and vertical scanning periods, said segments intersecting along at least a first non-rotatable predetermined boundary and along a second rotatable predetermined boundary, said generator comprising means for generating a first reference digital representation, means for generating a series of second digital representations to differentiate different time segments in a horizontal scanning period, means controlled by said second digital representations for disconnecting said video output from one of said video inputs and for connecting said video output to another of said video inputs at times such that said first non-rotatable predetermined boundary is established, means for generating a series of third digital representations corresponding to different time segments in a vertical scanning period under the control of said first reference digital representation such that the ratio of the numeric spacing between at least some successive representations in said series to the time durations of the corresponding time segments is determined by reference to the digital magnitude of said first reference digital representation, and means controlled by said second and third digital representations for disconnecting said video output from one of said video inputs and for connecting said video output to another of said video inputs at times such that said second rotatable predetermined boundary is established.

27. A video special effects generator for generating an output video waveform different image segments of which are derived from a plurality of different video input signals which have synchronized horizontal and vertical scanning periods, said segments intersecting along at least a first non-rotatable predetermined boundary and along a second rotatable predetermined boundary, said generator comprising means for generating a first reference digital representation, means for generating a series of second digital representations corresponding to different time segments in a horizontal scanning period, means for generating a series of third digital representations corresponding to different time segments in a vertical scanning period, means controlled by said third digital representations for disconnecting said video output from one of said video inputs and for connecting said video output to another of said video inputs at times such that said first non-rotatable predetermined boundary is established, means for generating a series of fourth digital representations corresponding to different time segments in a vertical scanning period under the control of said first reference digital representation such that the ratio of the numeric spacing between at least some successive representations in said series to the time durations of the corresponding time segments is determined by reference to the digital magnitude of said first reference digital representation, and means controlled by said second and fourth digital representations for disconnecting said video output from one of said video inputs and for connecting said video output to another of said video inputs at times such that said second rotatable predetermined boundary is established.

28. A video special effects generator for generating an output video waveform different image segments of which are derived from a plurality of different video input signals which have synchronized horizontal and vertical scanning periods, said segments intersecting along at least a first non-rotatable predetermined boundary and along a second rotatable predetermined boundary, said generator comprising means for generating a first reference digital representation, means for generating a series of second digital representations corresponding to different time segments in a horizontal scanning period, means for generating a series of third digital representations corresponding to different time segments in a vertical scanning period, means controlled by either or both of said second and third digital representations for disconnecting said video output from one of said video inputs and for connecting said video output to another of said video inputs at times such that said first non-rotatable predetermined boundary is established, means for generating a series fourth digital representations corresponding to different time segments in a vertical scanning period under the control of said first reference digital representation such that the ratio of the numeric spacing between at least some successive representations in said series to the time durations of the corresponding time segments is determined by reference to the digital magnitude of said first reference digital representation, and means controlled by said second and fourth digital representations for disconnecting said video output from one of said video inputs and for connecting said video output to another of said video inputs at times such that said second rotatable predetermined boundary is established.

29. A rotary special effects generator for generating an output video waveform different image segments of which are derived from a plurality of different video input signals which have synchronized horizontal and vertical scanning periods, said segments intersecting along at least one predetermined boundary which may be rotated about an image center, comprising means for generating a reference digital representation, means for generating a switching signal under the control of said reference digital representation which switching signal, if used to switch said output waveform between said input signals, would result in the establishment of said predetermined boundary, means for developing first signals which indicate what range of angular rotation said first reference digital representation is calling for, means for developing second signals indicative of what segment of an image is being scanned, and means controlled by said first and second signals for selectively permitting the switching of said output waveform under the control of said switching signal only in selected image segments for selected ranges of angular rotation.

30. A rotory special effects generator in accordance with claim 29 which also includes second means for generating a second switching signal under the control of said reference digital representation which second switching signal, if used to switch said output waveform between said input signals, would result in the establishment of a second boundary whose angle with the horizontal is complementary to the angle said first boundary makes with the horizontal, and wherein said means controlled by said first and second signal includes means for selectively permitting the switching of said output waveform under the control of said second switching signal only in selected image segments for selected ranges of angular rotation.

31. A rotational special effects generator for generating an output video waveform different image segments of which are derived from at least two different video input signals having synchronized horizontal and vertical scanning periods, said segments intersecting along at least one predetermined boundary which may be rotated, said generator comprising means for generating a first reference digital representation, means responsive to said first reference digital representation for switching said video output between said video input signals at times such that said predetermined boundary is a line which rotates about the image center in accordance with the magnitude of said first digital representation, and means for switching said video output between said video input signals at times such that a second, non-rotatable boundary line which passes through the image center is established, whereby 180° rotational wipe effects may be achieved.

32. A rotational special effects generator in accordance with claim 31 wherein said means for switching said video output to generate a non-rotatable boundary line comprise means for switching said video output at the midpoint of each vertical scan.

33. A rotational special effects generator for generating an output video waveform different image segments of which are derived from at least two different video input signals having synchroinzed horizontal and vertical scanning periods, said segments intersecting along at least one predetermined boundary which may be rotated, said generator comprising means for generating digital representations whose magnitude indicates the degree of rotation desired between 0° and 360°, means responsive to said digital representation for generating a first signal indicative of which quadrant (0°–90°, 90° to 180°, etc.) of rotation said first digital representation is calling for, means for generating a second signal indicative of which quadrant of an image is being supplied by said signals, means responsive to sid digital representation for generating a third signal which, if used by itself to control the switching of said input signals into said output waveform, would produce two counter-rotating boundaries, and means responsive to said first, second and third signals for permitting said third signal to control the switching of said input signals into said output waveform only when said first and second signal indicate that the quadrant of rotation agrees with the quadrant of the image that is supplied by said input signals, whereby a clock-hand wipe effect may be achieved.

34. A rotational special effects generator for generating an output video waveform different image segments of which are derived from at least two different video input signals having synchronized horizontal and vertical scanning periods, said segments intersecting along at least one predetermined boundary which may be rotated, said generator comprising means for generating a first reference digital representation whose magnitude indicates the degree of rotation desired, means for generating a series of second digital representations corresponding to different time segments in a horizontal scanning period, means for generating a third series of digital representations under the control of said first reference digital representation, and means responsive to said second and third series of digital representations for switching said video output between said video input signals at least twice during each horizontal scanning interval at times spaced symmetrically about the midpoint of each horizontal scanning interval to achieve at least two counter-rotating and centered boundaries which can execute a wipe effect under the control of said first referenced digital representation.

35. A rotational special effects generator as in claim 34 which includes means for preventing any switching from occurring during the scanning of a first half of an image when the magnitude of said first reference digital representation indicates a rotation within the range of 0° to 90°, whereby a fan wipe effect is achieved.

36. A video special effects generator for generating an output video waveform different image segments of which are derived from a plurality of different video input signals which have synchronized horizontal and vertical scanning periods, said segments intersecting along at least a first rotatable predetermined boundary, said generator comprising means for generating a first reference digital representation, means for developing from said first representation first switching signals which, when used to switch said input signals into said output waveform, results in the production of two perpendicular and centered rotatable boundaries, and means for developing second switching signals which, when used to switch said input signals into said output waveform, results in the production of two perpendicular and centered, non-rotatable boundaries, and switching means responsive to both said first and said second signal for switching said video output between said input signals when one of said signals fluctuate, whereby a propeller wipe effect is achieved.

37. In a digital special effects generator,
means for generating digital special effects;
means for developing a signal which changes its state at the midpoint of each horizontal scanning interval;
means for developing a signal which changes its state at the midpoint of each vertical scanning interval; and
means responsive to said signals for varying the nature of the special effect generated in each quadrant of the video image.

* * * * *